(12) United States Patent
Wang et al.

(10) Patent No.: US 7,800,806 B1
(45) Date of Patent: Sep. 21, 2010

(54) TWO-ELEMENT Fθ LENS WITH SHORT FOCAL DISTANCE FOR LASER SCANNING UNIT

(75) Inventors: Chih-Peng Wang, Taipei (TW);
Huang-Chang Chen, Taipei (TW);
San-Woei Shyu, Taipei (TW)

(73) Assignee: E-Pin Optical Industry Co., Ltd., Taipei (TW)

( * ) Notice: Subject to any disclaimer, the term of this patent is extended or adjusted under 35 U.S.C. 154(b) by 0 days.

(21) Appl. No.: 12/625,506

(22) Filed: Nov. 24, 2009

(30) Foreign Application Priority Data

Mar. 31, 2009 (TW) ............................... 98110775 A

(51) Int. Cl.
G02B 26/08 (2006.01)

(52) U.S. Cl. .............. 359/206.1; 359/207.3; 359/216.1; 359/662

(58) Field of Classification Search ... 359/205.1–207.6, 359/216.1–219.2, 662
See application file for complete search history.

(56) References Cited

U.S. PATENT DOCUMENTS

| | | | |
|---|---|---|---|
| 4,707,085 A | 11/1987 | Takanashi | |
| 5,086,350 A | 2/1992 | Nishihata | |
| 5,111,219 A | 5/1992 | Makino | |
| 5,136,418 A | 8/1992 | Itabashi | |
| 5,247,383 A * | 9/1993 | Brueggemann | 359/197.1 |
| 5,838,480 A | 11/1998 | McIntyre | |
| 6,295,116 B1 | 9/2001 | Eom | |
| 6,324,015 B1 | 11/2001 | Fuse | |
| 6,377,293 B2 | 4/2002 | Koh | |
| 6,757,088 B2 | 6/2004 | Shim | |
| 6,919,993 B2 | 7/2005 | Honda | |
| 6,933,961 B2 | 8/2005 | Kato | |
| 7,057,781 B2 | 6/2006 | Ishihara | |
| 7,079,171 B2 | 7/2006 | Sung | |
| 7,130,096 B2 | 10/2006 | Fujino | |
| 2001/0009470 A1 | 7/2001 | Kamikubo | |
| 2002/0030158 A1 | 3/2002 | Kodama | |
| 2002/0063939 A1 | 5/2002 | Eum | |
| 2009/0244672 A1 * | 10/2009 | Shih et al. | 359/206.1 |

FOREIGN PATENT DOCUMENTS

| | | |
|---|---|---|
| JP | 63-172217 A | 7/1988 |
| JP | 04-50908 | 2/1992 |
| JP | 2756125 B2 | 5/1998 |
| JP | 2004-294713 | 10/2004 |
| TW | I198966 | 3/2004 |

* cited by examiner

*Primary Examiner*—James Phan
(74) *Attorney, Agent, or Firm*—Wang Law Firm; Li K. Wang

(57) ABSTRACT

A two-element fθ lens with short focal distance for a laser scanning unit comprises a first lens and a second lens. The first lens has first and second optical surfaces, the second lens has third and fourth optical surfaces, and all the optical surfaces in a main scanning direction on the optical axis are aspherical surfaces. The fourth optical surface has an inflection point in SAG counted from the optical axis to peripheral portion and its paraxial portion is convex that is disposed on the polygon mirror side. The two-element fθ lens satisfies an optical condition of: $0.5429 \leqq \tan(\beta) \leqq 1.2799$, wherein β is a maximum effective window angle. The first and second lenses of the two-element fθ lens with short focal distance of the invention effectively reduces the distance from the polygon mirror to an imaging surface to achieve the purpose for reducing the volume of the laser scanning unit.

4 Claims, 23 Drawing Sheets

TWO-ELEMENT Fθ LENS WITH SHORT FOCAL DISTANCE FOR LASER SCANNING UNIT

BACKGROUND OF THE INVENTION

1. Field of the Invention

The present invention relates to a two-element fθ lens with short focal distance for a laser scanning unit, and more particularly to a two-element fθ lens used for a laser scanning unit with a polygon mirror, which has a short focal distance to reduce the volume size of the laser scanning unit.

2. Description of the Related Art

At present, a laser scanning unit (LSU) used in a laser beam printer (LBP) controls a laser beam scanning by a high-speed polygon mirror as disclosed in U.S. Pat. Nos. 7,079,171, 6,377,293 and 6,295,116 or TW Pat. No. 1198966, and the principles of their operation are described below: a semiconductor laser emits a laser beam through a collimator and an aperture to form parallel beams. After the parallel beams pass through a cylindrical lens, the beams are focused at the width of the Y-axis in the sub scanning direction and along a direction parallel to the X-axis of the main scanning direction to form a line image and projected onto a high-speed polygon mirror. The polygon mirror includes a plurality of continuous reflecting mirrors disposed precisely at or proximate to the focal point of the line image. The polygon mirror is provided for controlling the direction of projecting the laser beam, so that when a plurality of continuous reflecting mirrors are rotated at a high speed, the laser beam projected onto a reflecting mirror can be extended in a direction parallel to the main scanning direction (x-axis) at the same angular velocity and deviated from and reflected onto a fθ lens. The fθ lens is installed next to the polygon mirror and can be either a single-element lens structure (or a single-element scanning lens) or a two-element lens structure. The function of this fθ lens is to focus a laser beam reflected by the reflecting mirror of the polygon mirror and projected onto the fθ lens into a circular or oval spot that is projected onto a photoreceptor surface (or a photoreceptor drum, which is an imaging surface) to achieve the requirements of the scanning linearity as disclosed in U.S. Pat. Nos. 4,707,085 and 6,757,088 and Japan Pat. No. 2004-294713. However, the traditional fθ lens still has the following drawbacks:

(1) When a laser beam is reflected from a polygon mirror, the central of the laser beam projected onto a reflecting mirror of the polygon mirror is not aligned physically with the central rotating axis of the polygon mirror, then the design of a fθ lens has to take the issue of a reflection deviation of the polygon mirror into consideration. In a traditional optical correction method, a sub scanning direction is used for correcting the optics of a main scanning direction as disclosed in U.S. Pat. Nos. 5,111,219 and 5,136,418 and Japan Pat. No. 2756125. A longer focal length is required to correct the reflection deviation by the sub scanning direction appropriately, but such arrangement also increases the volume of the laser scanning unit.

(2) To meet the specifications and using requirements for the diameter of the spot formed on the drum by the scanning light of the fθ lens, the prior art generally adopts a longer focal length to provide a better image quality, or even uses a reflecting mirror to extend the imaging distance as disclosed in U.S. Pat. No. 2002/0063939; or a three-element lens as disclosed in U.S. Pat. Nos. 2002/0030158 and 5,086,350, and Japan Pat. No. JP63-172217; or a hard-to-manufacture diffraction lens as disclosed in U.S. Pat. Nos. 2001/0009470 and 5,838,480; or a two-element lens having an inflection point as disclosed in U.S. Pat. Nos. 5,111,219, 7,057,781 and 6,919,993; or a single-element lens having an inflection point as disclosed in Japan Pat. No. JP04-50908.

(3) For the applications of a small printer, the imaging distance of the drum is decreased to reduce the volume of a laser scanning unit (LSU) as disclosed in U.S. Pat. No. 7,130,096 and adopts a method of limiting the ratio of the effective scanning range and the image optical distance (optical length) to reduce the imaging distance on the drum and eliminate ghost images; U.S. Pat. No. 6,324,015 adopts a method of limiting the distance (or focal distance) between the polygon mirror and the drum and the focal length ratio (d/f) of the fθ lens to reduce the distance, wherein the focal distance is approximately equal to 200 mm, and the focal length is equal to 100 mm for the illustration; U.S. Pat. No. 6,933,961 discloses a method of limiting the distance from the last spot (or the end of the scanning line) to an optical surface of the fθ lens, but the maximum scanning angle is approximately equal to 27.6 degrees, which cannot reduce the focal distance effectively.

To satisfy consumer requirements for a light, thin, short and compact design of the laser scanning unit, a two-element fθ lens with a short focal distance (such as a focal distance less than 150 mm for an A4 sized laser printer) may be adopted the needs in effective correcting optical distortion in the main scanning and sub scanning directions as well as in improving the scanning quality and the resolution.

SUMMARY OF THE INVENTION

Therefore, it is a primary objective of the present invention to provide a two-element fθ lens with short focal distance for a laser scanning unit, and the two-element fθ lens is applicable to a laser scanning unit having a polygon mirror, wherein the two-element fθ lens with short focal distance along an optical axis from a polygon mirror side to a target side includes a first lens having a first optical surface and a second optical surface and a second lens having a third optical surface and a fourth optical surface. The two-element fθ lens with short focal distance is characterized in that each optical surface of the two-element fθ lens with short focal distance in the main scanning direction is an aspherical surface; and the concave surfaces including the first, second and third optical surfaces along the optical axis in the main scanning direction are disposed on the polygon mirror side, and the fourth optical surface has an inflection point in SAG counted from the optical axis to peripheral portion and its paraxial portion is convex toward the polygon mirror side. The two-element fθ lens is primarily for uniformizing the scanning light in the main scanning direction and the sub scanning direction to focus the scanning light on the target and for correcting the optical distortion caused by the deviation of the scanning light from the optical axis, so as to form a correct image of the scanning light reflected from the polygon mirror onto the target and achieve a scanning linearity required by the laser scanning unit.

Another objective of the present invention is to provide a two-element fθ lens with short focal distance for a laser scanning unit, and the two-element fθ lens with short focal distance to achieve the effect of reducing the volume of the laser scanning unit and also provides a good imaging effect, and satisfies the condition $0.5429 \leq \tan(\beta) \leq 1.2799$, wherein $\beta$ is the maximum effective window angle falling within a range from 28.5° to 52°, such that a laser beam reflected from the polygon mirror to the two-element fθ lens with short focal distance can meet the requirements of a spot area formed on the target by projecting a scanning light with a shorter focal distance to achieve the effect of reducing the volume of the laser scanning unit volume.

A further objective of the present invention is to provide a two-element fθ lens with short focal distance for a laser scanning unit, and the two-element fθ lens with short focal distance can correct a distortion since the deviation of a scanning light from the optical axis, so that the deviations along the main scanning direction and the sub scanning direction are increased, and the image spot formed on the drum is deformed, and each image spot size can be uniformed to achieve the effect of improving the resolution quality.

Therefore, the two-element fθ lens with short focal distance for a laser scanning unit in accordance with the present invention is at least applicable for the laser scanning unit, wherein a reflecting mirror is installed on the polygon mirror to reflect and convert a laser beam emitted by a light source into a scanning light to form an image on a target. For a laser printer, the target is generally a drum. After a spot of the image of a scanning light is formed by scanning the laser beam emitted from a light source and reflected from the reflecting mirror of the polygon mirror, the angle and position of the scanning light of the two element fθ lens with a short focal distance in accordance with the present invention are corrected by the two-element fθ lens of the present invention in order to form a spot on the drum. Since the drum is coated with a photosensitive agent and the photosensitive agent is used for sensing and collecting carbon powder on a piece of paper, therefore data can be printed out.

To make it easier for our examiner to understand the technical characteristics and effects of the present invention, we use preferred embodiments and related drawings for the detailed description of the present invention as follows.

DETAILED DESCRIPTION OF THE PREFERRED EMBODIMENTS

Figure 1:
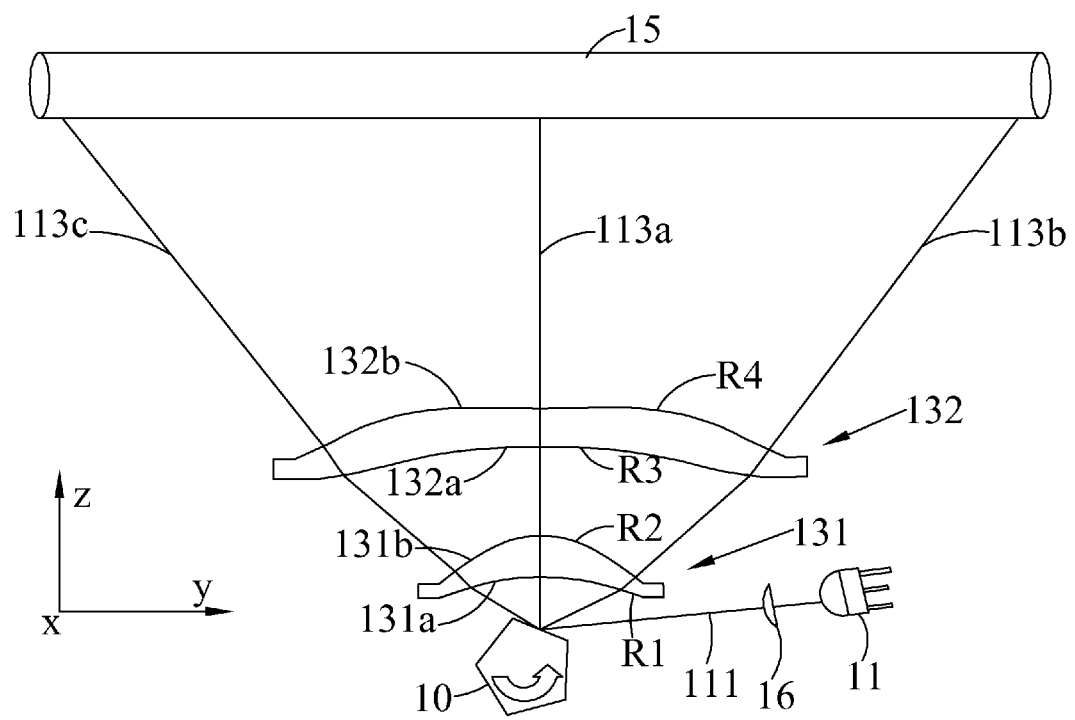
FIG. 1 is a schematic view of optical paths of a two-element fθ lens with short focal distance in accordance with the present invention.
Figure 2:
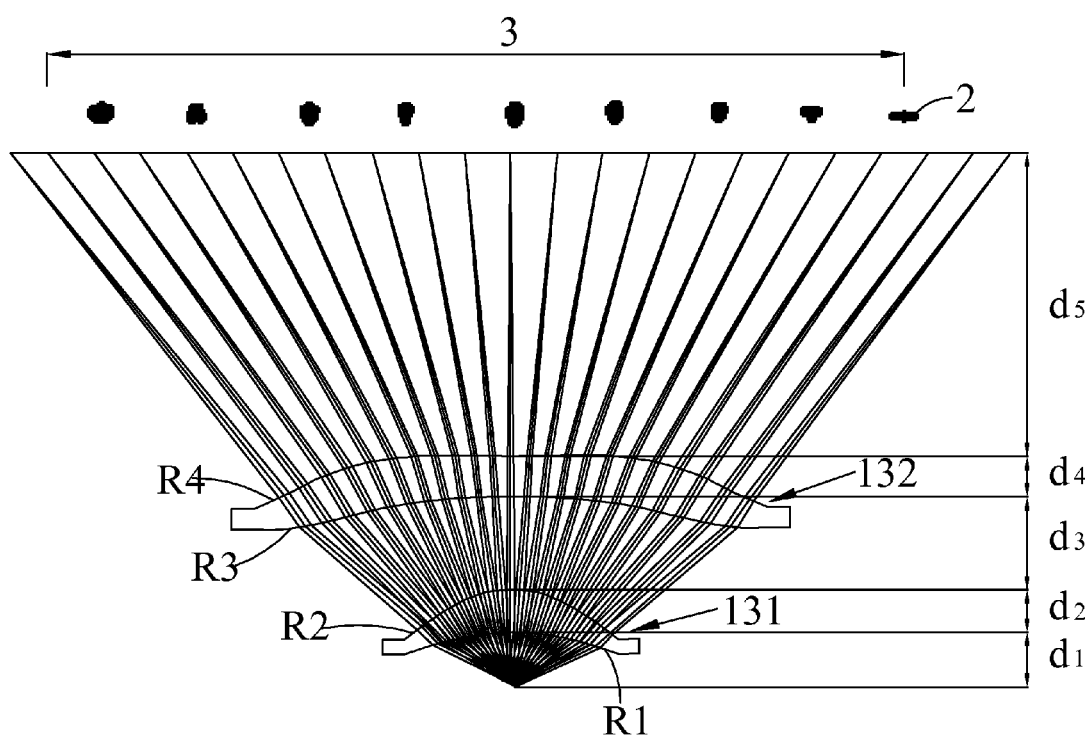
FIG. 2 is a schematic view of optical paths, symbols, and spot areas of a scanning light that passes through a first lens and a second lens of a two-element fθ lens with short focal distance varying with different projecting positions in accordance with the present invention.

With reference to FIG. 1, which illustrates a schematic view of optical paths of a two-element fθ lens with short focal distance for a laser scanning unit in accordance with the present invention. The two-element fθ lens with short focal distance comprises a first lens 131 having a first optical surface 131a and a second optical surface 131b, and a second lens 132 having a third optical surface 132a and a fourth optical surface 132b, and is applicable to a laser scanning unit. In FIG. 1, the laser scanning unit mainly includes a laser source 11, a polygon mirror 10, a cylindrical lens 16, and a target for sensing light. The target is a drum 15 in this preferred embodiment. After a light beam 111 provided by the laser source 11 passes through the cylindrical lens 16, the light beam 111 is projected onto the polygon mirror 10. The polygon mirror 10 includes a plurality of reflecting mirrors (which is a five reflection mirrors are used in this embodiment), and each reflecting mirror can be rotated with respect to a central rotation axis of the polygon mirror for reflecting and converting the light beam 111 into scanning lights 113a, 113b. The X direction in which the scanning lights 113a, 113b are projected is called a sub scanning direction, and the Y direction in which the scanning lights are projected is called a main scanning direction. The distance between the most left end and the most right ends on the drum 15 formed by the scanning lights 113a, 113b emitted from the fourth optical surface 132b of the fθ lens is the width of an effective window 3, as shown in FIG. 2. Original document data on spots within the effective window can be printed on printing paper by a toner.

With reference to FIGS. 1 and 2, FIG. 2 shows optical paths of scanning lights passing through a first lens and a second lens. When the laser source 11 starts emitting the laser light beam 111, the laser light beam 111 is reflected from the polygon mirror 10 and converted into a scanning light. When the scanning light passes through the first lens 131, the scanning light will be refracted by the first optical surface 131a and the second optical surface 131b of the first lens 131, further more, the scanning light emitted from the first lens 131 is refracted by the third optical surface 132a and the fourth optical surface 132b of the second lens 132. The scanning light, which is reflected by the polygon mirror 10 and exhibits a nonlinear relationship between distance and time, of the reflection of the scanning light from the polygon mirror 10 is converted into a scanning light exhibiting a linear relationship between distance and time by the first lens 131 and the second lens 132. After the scanning lights pass through the first lens 131 and the second lens 132, the scanning lights are focused onto the drum 15 to form a row of spots 2 on the drum 15 by the optical properties of the first optical surface 131a, second optical surface 131b, third optical surface 132a, and fourth optical surface 132b, wherein $d_0$ is the minimum distance (not shown in the figure) from the cylindrical lens 16 along the center line of the laser light beam to the reflecting surface of the polygon mirror 10; $d_1$ is the distance from the polygon mirror 10 to the first optical surface 131a along the optical axis; $d_2$ is the distance from the first optical surface 131a to the second optical surface 131b along the optical axis; $d_3$ is the distance from the second optical surface 131b to the third optical surface 132a along the optical axis; $d_4$ is the distance from the third optical surface 132a to the fourth optical surface 132b along the optical axis; $d_5$ is the distance from the fourth optical surface 132b to the drum 15 along the optical axis; $R_1$ is the radius of curvature of the first optical surface 131a; $R_2$ is the radius of curvature of the second optical surface 131b; $R_3$ is the radius of curvature of the third optical surface 132a; and $R_4$ is the radius of curvature of the fourth optical surface 132b.

Figure 3:
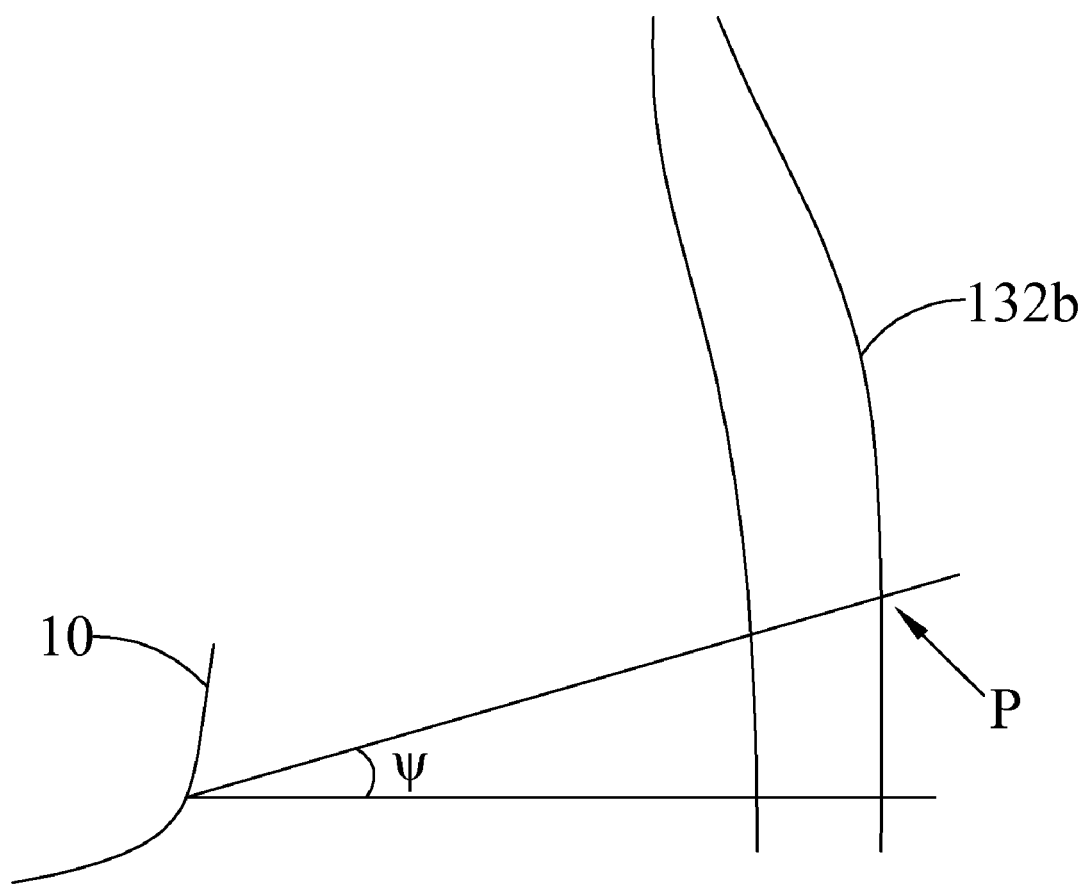
FIG. 3 is a schematic view of an inflection point of a fourth optical surface of a second lens of a two-element fθ lens with short focal distance in accordance with the present invention.

The fourth optical surface 132b is an optical surface having an inflection point in SAG counted from the optical axis to peripheral portion and its paraxial portion in the main scanning direction, and the paraxial portion of the fourth optical surface 132b is convex toward the polygon mirror 10, as shown in FIG. 3. The fourth optical surface 132b is gradually inverted away from the optical axis such that the convex surface becomes a concave surface facing the side of the polygon mirror 10 after it exits the central axis of the scan and passes through at the inflection point inflection point P.

Figure 4:
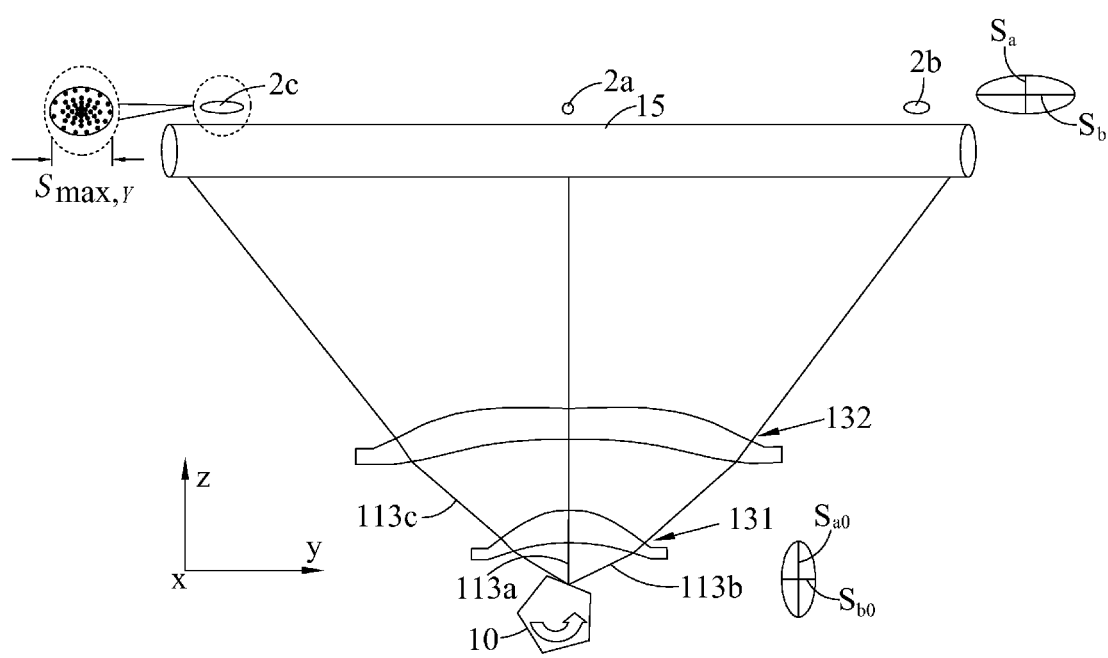
FIG. 4 is a schematic view showing a geometric spot and symbols of a drum of a two-element fθ lens with short focal distance in accordance with the present invention.

With reference to FIG. 4, which illustrates a schematic view showing a spot area varying with different positions after the scanning light is projected onto the drum. The scanning light 113a is projected onto the drum after, passing through the first lens 131 and the second lens 132 in the main scanning direction and sub scanning direction and is projected onto the drum 15. Since the angle between the optical axis and the scanning light 113a is aligned in the main scanning direction (the angle is zero), thus the minimum deviation is produced. The spot 2a imaged on the drum 15 has a quasi-circular shape. Except perfect distortion is corrected in main scanning direction, when the scanning lights 113b, 113c passing through the first lens 131 and the second lens 132 are projected onto the drum 15, the included angles between the light incident into the first lens 131 and the second lens 132 and the optical axis are non-zero, and thus the deviation produced in the main scanning direction is leaded, such as spots 2b and 2c. The projection length is greater than the spot formed by the scanning light 113a in the main scanning direction. This situation also occurs in the sub scanning direction too. The spots formed by the scanning lights 113b, 113c deviated from the scanning light 113a are greater than spot 2a, and thus the spots 2b and 2c imaged on the drum 15 are in a quasi-elliptical shape, and the areas of the spots 2b, 2c are larger than the area of the spot 2a, normally. $S_{a0}$ and $S_{b0}$ are root means square radii of a spot formed by the scanning light on a reflecting surface of the polygon mirror 10 in the main scanning direction (Y direction) and the sub scanning direction (X direction) respectively, $S_a$ and $S_b$ are root means square radii of a spot on the target in the X direction and the Y direction respectively, and $S_{max, Y}$ is the maximum radius of any spot in the main scanning direction.

Figure 5:
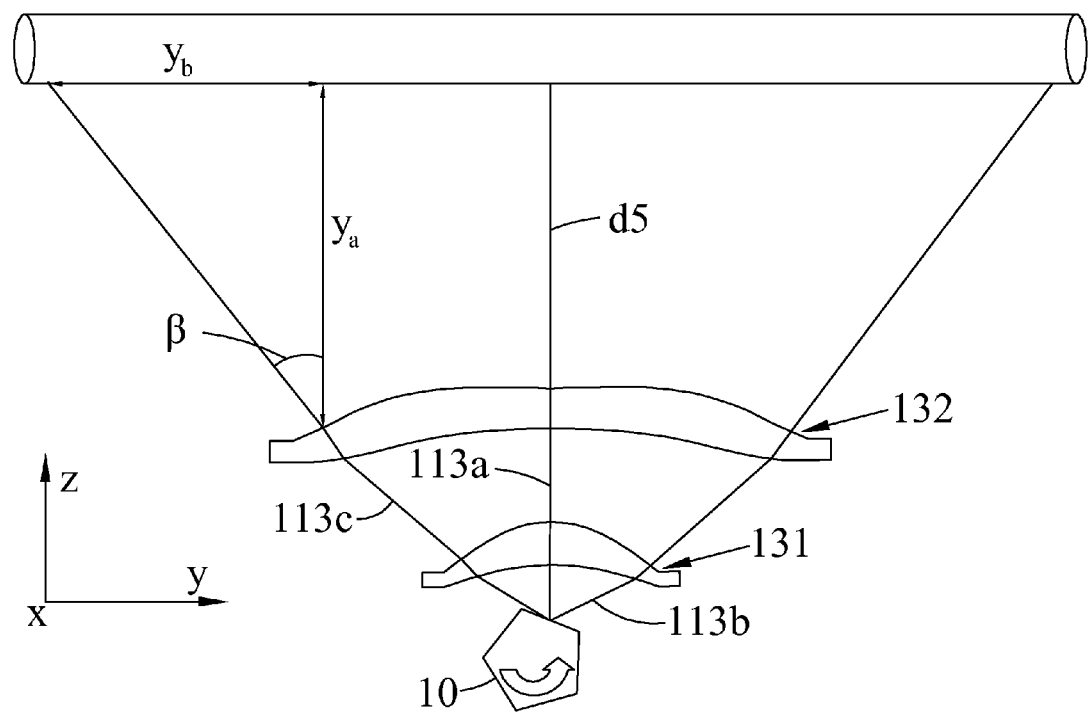
FIG. 5 is a schematic view of a maximum effective window angle between a two-element fθ lens with short focal distance and a drum in accordance with the present invention.

With reference to FIG. 5, which illustrates a schematic view showing an effective window and a maximum effective window angle β of a scanning light projected onto the drum 15. After scanning light 113b at the most left end is emitted from the fourth optical surface 132b of the second lens 132, the included angle between the scanning light 113c and a straight line parallel to the optical axis is defined as the maximum value of an effective window angle. The imaging distance from the polygon mirror 10 to the drum 15 can be shortened, that is the focal distance can be shortened to achieve the purpose of reducing the volume of the laser scanning unit. To reduce the focal distance, the factors in the optical design such as the optical properties of the four optical surfaces of the first lens 131 and the second lens 132, the physical properties (such as refraction index and Abbe number) of the material for use in the first lens 131 and the second lens 132 can be adapted to shorten the focal distance (d1+d2+d3+d4+d5). In addition to an air space (d1+d3+d5) and the value of the maximum effective window angle β can be designed in increasing the opening angle of the scanning lights. The relationship between the maximum effective window angle β and the distance from the second lens 132 to the drum 15 is represented by Equation (1). The value of ya can be effectively reduced as the increasing the value of β under a fixed effective window is applied.

$$\beta = \tan^{-1}\left(\frac{y_b}{y_a}\right) \quad (1)$$

Where, $y_a$ is the distance along the main scanning direction (Y direction) between the center of light spot on the drum 15 which projected by the end scanning light (either the most left end 113c or the most right end 113b) emitted from the fourth optical surface 132b of the second lens 132 and the incident point which emerged from the point by the end scanning light and the fourth optical surface 132b, and $y_b$ is the distance along the sub scanning direction (X direction) between the center of light spot on the drum 15 which projected by the end scanning light (either the most left end 113c or the most right end 113b) emitted from the fourth optical surface 132b of the second lens 132 and the intersection point on the drum 15 which emerged from the line paralleled to the optical axis on the incident point and the drum 15.

In summation of the description above, the two-element fθ lens with short focal distance in accordance with the present invention corrects the distortion of a scanning light reflected from the polygon mirror 10 and converts the angular velocity relationship into a distance velocity relationship. In the main scanning direction (Y direction) and the sub scanning direction (X direction), the scanning lights passing through the fθ lens produces a uniform spot on the imaging surface to provide a desired resolution and effectively reduces the focal distance to reduce the volume of the laser scanning unit.

To achieve the aforementioned effects, the present invention provides a two-element fθ lens with short focal distance, wherein the first optical surface 131a or second optical surface 132a of the first lens 131 or the third optical surface 132a or fourth optical surface 132b of the second lens 132 is designed as a spherical surface or an aspherical surface in the main scanning direction or the sub scanning direction. If the design of the aspherical surface is adopted, the aspherical surface can be calculated by the following equations:

1: Toric Equation $$Z = Zy + \frac{(Cxy)X^2}{1 + \sqrt{1 - (Cxy)^2 X^2}} \quad (2)$$

$$Cxy = \frac{1}{(1/Cx) - Zy}$$

$$Zy = \frac{(Cy)Y^2}{1 + \sqrt{1 - (1 + Ky)(Cy)^2 Y^2}} + B_4 Y^4 + B_6 Y^6 + B_8 Y^8 + B_{10} Y^{10}$$

Where, Z is the SAG of any point on the lens surface in the direction of the optical axis to a tangential plane at the point 0; $C_x$ and $C_y$ are curvatures in the X direction and the Y direction respectively; $K_y$ is a conic coefficient in the Y direction; $B_4$, $B_6$, $B_8$ and $B_{10}$ are deformations from the conic coefficient of rotationally symmetric portions of the fourth order, the sixth order, the eighth order and the tenth order (4th~10th order coefficients) respectively; and if $C_x = C_y$ and $K_y = A_p = B_p = C_p = D_p = 0$, the surface is simplified as a single spherical surface.

2: Extended Polynomial Equation $$Z = \frac{CR^2}{1 + \sqrt{1 - (1 + k)C^2 R^2}} + \sum_{i=1}^{N} A_i E_i(X, Y) \quad (3)$$

$$= \frac{CR^2}{1 + \sqrt{1 - (1 + k)C^2 R^2}} + A_{11}X + A_{12}Y + A_{21}X^2 +$$

$$A_{22}XY + A_{23}Y^2 + A_{31}X^3 + A_{32}X^2Y + A_{33}XY^2 + A_{34}Y^3 +$$

$$A_{41}X^4 + A_{42}X^3Y + A_{43}X^2Y^2 + A_{44}XY^3 + A_{45}Y^4 +$$

$$A_{51}X^5 + A_{52}X^4Y + A_{53}X^3Y^2 + A_{54}X^2Y^3 + A_{55}XY^4 + A_{56}Y^5 +$$

$$A_{61}X^6 + A_{62}X^5Y + A_{63}X^4Y^2 + A_{64}X^6Y^3 + A_{65}X^2Y^4 +$$

$$A_{66}XY^5 + A_{67}Y^6 + A_{71}X^7 + A_{72}X^6Y + A_{73}X^5Y^2 + A_{74}X^4Y^3 +$$

$$A_{75}X^3Y^4 + A_{76}X^2Y^5 + A_{77}XY^6 + A_{78}Y^7 + \ldots$$

Where, Z is the SAG of any point on the lens surface in the direction of the optical axis to the tangential plane at the point 0; C is a curvature at the pole of the surface; K is a conic coefficient; and $A_{ij}$ is the $i^{th}$ order coefficient of the polynomial.

To maintain an constant scanning speed of projecting the scanning light on an imaging surface of a target, such as maintaining an equal interval between two spots within two equal time intervals, the two-element fθ lens with short focal distance in accordance with the present invention corrects the exit angles of scanning lights situated between the scanning light 113a and the scanning light 113b by correcting the scanning lights emitted from the first lens 131 and the second lens 132, such that after the exit angles of two scanning lights within an equal time interval is corrected, the distances of forming two spots on the drum 15 are equal, such that the sizes of the spots formed on the drum 15 can be uniformized (and restricted within the range of the required resolution) to achieve the best resolution effect.

The two-element fθ lens with short focal distance in accordance with the present invention comprises a first lens 131 and a second lens 132 along an optical axis from a polygon mirror 10 to a target, wherein the first lens 131 has a first optical surface 131a and a second optical surface 131b, and the second lens 132 has a third optical surface 131a and a fourth optical surface 131b, and concave surfaces of the first, second and third optical surfaces 131a, 131b, 132a in the main scanning direction on the optical axis are disposed on the side of the polygon mirror 10, and the fourth optical surface 132b has an inflection point in SAG counted from the optical axis to peripheral portion and its paraxial portion is convex, and whose convex surface is disposed on the side of the polygon mirror 10 and provided for converting the scanning light which is reflected by the polygon mirror 10 and exhibits a non-linear relationship between angle and time into a scanning light spot exhibiting a linear relationship between distance and time, and focusing the scanning light spot onto the target after the optical distortion is corrected, wherein the first optical surface 131a, second optical surface 131b, third optical surface 132a and fourth optical surface 132b in the main scanning direction are optical surfaces formed by an aspherical surface; and the first optical surface 131a, second optical surface 131b, third optical surface 132a and fourth optical surface 132b in the sub scanning direction are optical surface composed of at least one aspherical surface. For the optical effect of the first lens 131 and the second lens 132, the air space (d1+d3+d5) and the maximum effective window angle β of the two-element fθ lens with short focal distance of the present invention satisfies the conditions of Equations (4) and (5):

$$2.5 \leq \frac{d_1 + d_3 + d_5}{f_s} \leq 5.2 \quad (4)$$

$$0.5429 \leq \tan(\beta) \leq 1.2799 \quad (5)$$

or satisfies Equation (6) in the main scanning direction:

$$0.06 \leq \left| f_s \cdot \left( \frac{(n_{d1} - 1)}{f_{(1)y}} + \frac{(n_{d2} - 1)}{f_{(2)y}} \right) \right| \leq 0.22 \quad (6)$$

where, $d_1$ is the distance from a reflecting surface of the polygon mirror 10 on the optical axis to an optical surface of the first lens 131 on the polygon mirror side; $d_3$ is the distance from an optical surface on the target side of the first lens 131 on the optical axis to an optical surface of the second lens 132 on the side of the polygon mirror 10; $d_s$ is the distance from an optical surface of the second lens 132 on the target side on the optical axis to the target; $f_s$ is a composition focal length of the two-element fθ lens; β is a maximum effective window angle; $f_{(1)y}$ is a focal length of the first lens 131 in the main scanning direction; $f_{(2)y}$ is a focal length of the second lens 132 in the main scanning direction, and $n_{d1}$ and $n_{d2}$ are the refraction indexes of the first lens 131 and the second lens 132 respectively.

In addition, the uniformity of the spots formed by the two-element fθ lens with short focal distance in accordance with the present invention can be represented by the ratio of the maximum radii $S_{max,Y}$ of the spots of the scanning light projected at the Y position of the drum 15 and satisfies the condition of Equation (7):

$$0.10 \leq \delta = \frac{\min(S_{max,Y})}{\max(S_{max,Y})} \quad (7)$$

Where, $\delta$ is the ratio of the size of the smallest spot to the size of the largest spot on the drum 15.

The resolution provided by the two-element fθ lens of the present invention can be represented by the ratio values $\eta_{max}$ and $\eta_{min}$, wherein $\eta_{max}$ is a ratio of the maximum value of a geometric spot formed on the drum 15 to the size of a geometric spot formed by the scanning light on a reflecting surface of the polygon mirror 10 and $\eta_{min}$ is the ratio of the minimum value of a geometric spot formed on the drum 15 to the size of a geometric spot formed by the scanning light on a reflecting surface of the polygon mirror 10, and they satisfy Equations (8) and (9):

$$\eta_{max} = \frac{\max(S_b \cdot S_a)}{(S_{b0} \cdot S_{a0})} \leq 0.05 \quad (8)$$

$$\eta_{min} = \frac{\min(S_b \cdot S_a)}{(S_{b0} \cdot S_{a0})} \leq 0.005 \quad (9)$$

Where, $S_a$ and $S_b$ are root means square radii of a spot formed by the scanning light on the drum 15 in the X direction and the Y direction respectively; $\eta$ is the ratio value of a spot of a scanning light on a reflecting surface of the polygon mirror 10 and a spot on the drum 15; $S_{a0}$ and $S_{b0}$ are root means square radii of the spots formed by the scanning light on a reflecting surface of the polygon minor 10 in the sub scanning direction and the main scanning direction respectively.

To make it easier for our examiner to understand the structure and technical characteristics of the present invention, we use preferred embodiments together with related drawings for the detailed description of the present invention as follows:

The preferred embodiments of the present invention as disclosed below illustrate the major components of the two-element fθ lens with short focal distance for laser scanning unit, and thus the preferred embodiments can be applied in a laser scanning unit having a polygon minor, which is a general laser scanning unit. In addition to the elements disclosed in the two-element fθ lens with short focal distance of the present invention, other structures are well known by persons ordinarily skilled in the art. The two-element fθ lens with short focal distance for the laser scanning unit disclosed in the present invention are not limited to those disclosed in the preferred embodiments only, but modifications, alternatives and equivalents are intended to be covered in the scope of the present invention. For example, the design of radius of curvature, the selection of material, and the adjustment of interval of the first lens 131 and the second lens 132 are not limited to the following preferred embodiments only. To facilitate the illustration and comparison, the following preferred embodiments adopt the root mean square radii of the spots of scanning lights formed on polygon minor 10 equal to $S_{a0}$=7.22 (μm) and $S_{b0}$=660.94 (μm) respectively, but the invention is not limited to such design only.

Figure 6:
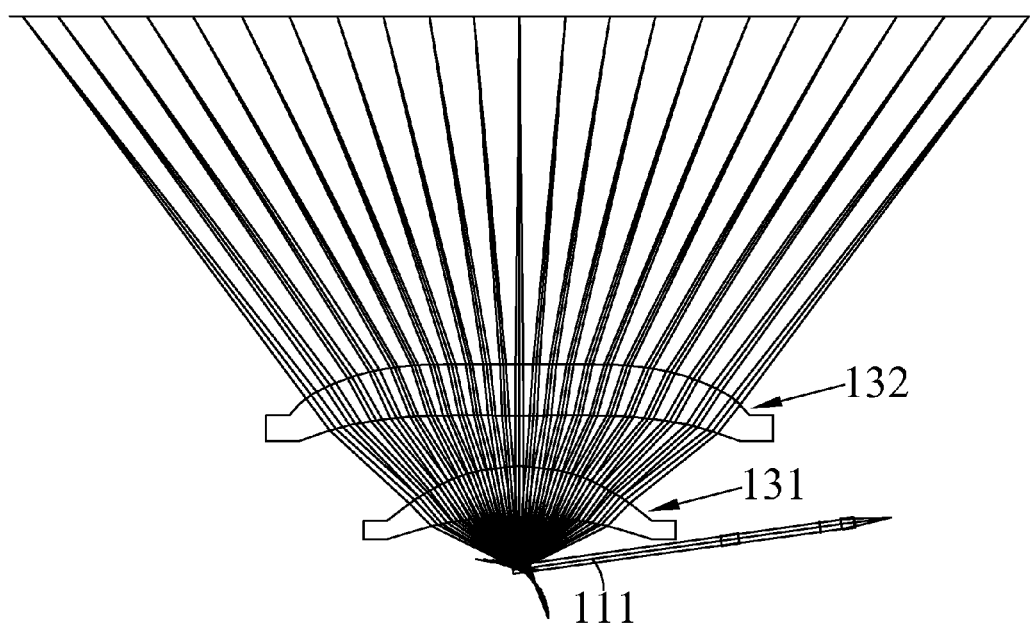
FIG. 6 is a schematic view of optical paths in accordance with a first preferred embodiment of the present invention.

In a first preferred embodiment, the two-element fθ lens with short focal distance in accordance with this preferred embodiment comprises a first lens 131 having a second optical surface 131b and a second lens 132 having a third optical surface 132a, and these optical surfaces 131b, 132a are aspherical surfaces which are optical surfaces designed by Equation (3), and a first optical surface 131a of the first lens 131 and a fourth optical surface 132b of the second lens 132 in the main scanning direction are aspherical surfaces which are optical surfaces designed by Equation (2). The optical characteristic and the parameters of the aspherical surfaces are listed in Tables 1 and 2, and an optical path diagram is shown in FIG. 6, and an inflection point of the fourth optical surface 132b is situated at an angle of φ=4.12°.

TABLE 1

List of Optical Properties of fθ lens of First Preferred Embodiment
fs = 30.221

| optical surface | Radius (mm) | Thickness d (mm) | refraction index $n_d$ |
|---|---|---|---|
| reflecting mirror | ∞ | 12.00 | 1 |
| reflecting surface R0 | | | |
| lens 1 | | | 1.529 |
| R1(Toric) | | | |
| R1x | ∞ | 11.70 | |
| R1y* | −93.880 | | |
| R2(Ext. polynomial) | | | |
| R2x* | −38.449 | 11.77 | |
| R2y* | −38.449 | | |
| lens 2 | | | 1.529 |
| R3(Ext. polynomial) | | | |
| R3x* | −56734.738 | 11.73 | |
| R3y* | −56734.738 | | |
| R4(Toric) | | | |
| R4x | −48.243 | 79.87 | |
| R4y* | 13578.669 | | |
| drum R5 | ∞ | 0.0 | |

*apherical surface

TABLE 2(A)

Parameters of Aspherical Surface of Optical Surface of First Preferred Embodiment

| | Toric Equation Coefficient | | | | |
|---|---|---|---|---|---|
| Optical Surface | Conic Coefficient (Ky) | 4th Order Coefficient (B4) | 6th Order Coefficient (B6) | 8th Order Coefficient (B8) | 10th Order Coefficient (B10) |
| R1* | −1.0145E+01 | −9.8372E−07 | −1.7388E−10 | 6.9464E−15 | −9.2575E−17 |
| R4* | 4.6428E+04 | −1.5454E−06 | −6.9730E−11 | 3.5310E−14 | −6.2971E−18 |

TABLE 2(B)

Parameters of Aspherical Surface of Optical Surface of First Preferred Embodiment

| R2* | Extend Polynomial Equation Coefficient | | | | | | | K (Conic Coefficent) = −1.7231 | |
|---|---|---|---|---|---|---|---|---|---|
| Ai | $Y^0$ | $Y^1$ | $Y^2$ | $Y^3$ | $Y^4$ | $Y^5$ | $Y^6$ | $Y^7$ | $Y^8$ |
| $X^0$ |  | 0.0000E+00 | 0.0000E+00 | 5.1210E−06 | −2.9117E−06 | 1.0457E−08 | 1.2662E−09 | 0.0000E+00 | −8.6573E−13 |
| $X^1$ | 0.0000E+00 | 0.0000E+00 | 0.0000E+00 | 0.0000E+00 | 0.0000E+00 | 0.0000E+00 | 0.0000E+00 | 0.0000E+00 |  |
| $X^2$ | −3.2268E−02 | −1.1795E−04 | 9.9232E−06 | −2.7224E−07 | −1.2573E−08 | 0.0000E+00 | 1.7335E−11 |  |  |
| $X^3$ | 0.0000E+00 | 0.0000E+00 | 0.0000E+00 | 0.0000E+00 | 0.0000E+00 | 0.0000E+00 |  |  |  |
| $X^4$ | 4.6014E−05 | 8.3269E−05 | −3.2954E−06 | 0.0000E+00 | 8.6395E−09 |  |  |  |  |
| $X^5$ | 0.0000E+00 | 0.0000E+00 | 0.0000E+00 | 0.0000E+00 |  |  |  |  |  |
| $X^6$ | 0.0000E+00 | 0.0000E+00 | 0.0000E+00 |  |  |  |  |  |  |
| $X^7$ | 0.0000E+00 | 0.0000E+00 |  |  |  |  |  |  |  |
| $X^8$ | 0.0000E+00 |  |  |  |  |  |  |  |  |

| R3* | Extend Polynomial Equation Coefficient | | | | | | | K (Conic Coefficent) = 1169268.05 | |
|---|---|---|---|---|---|---|---|---|---|
| Ai | $Y^0$ | $Y^1$ | $Y^2$ | $Y^3$ | $Y^4$ | $Y^5$ | $Y^6$ | $Y^7$ | $Y^8$ |
| $X^0$ |  | 0.0000E+00 | 0.0000E+00 | 4.1622E−06 | −1.5890E−06 | 9.2267E−10 | 2.8310E−10 | 0.0000E+00 | −3.2174E−14 |
| $X^1$ | 0.0000E+00 | 0.0000E+00 | 0.0000E+00 | 0.0000E+00 | 0.0000E+00 | 0.0000E+00 | 0.0000E+00 | 0.0000E+00 |  |
| $X^2$ | 5.8358E−03 | −1.7817E−04 | −2.6949E−06 | 6.0877E−09 | 1.1117E−09 | 0.0000E+00 | −3.2895E−14 |  |  |
| $X^3$ | 0.0000E+00 | 0.0000E+00 | 0.0000E+00 | 0.0000E+00 | 0.0000E+00 | 0.0000E+00 |  |  |  |
| $X^4$ | −2.6308E−05 | 2.9375E−05 | 9.5494E−09 | 0.0000E+00 | 3.4675E−10 |  |  |  |  |
| $X^5$ | 0.0000E+00 | 0.0000E+00 | 0.0000E+00 | 0.0000E+00 |  |  |  |  |  |
| $X^6$ | 0.0000E+00 | 0.0000E+00 | 0.0000E+00 |  |  |  |  |  |  |
| $X^7$ | 0.0000E+00 | 0.0000E+00 |  |  |  |  |  |  |  |
| $X^8$ | 0.0000E+00 |  |  |  |  |  |  |  |  |

Figure 7:
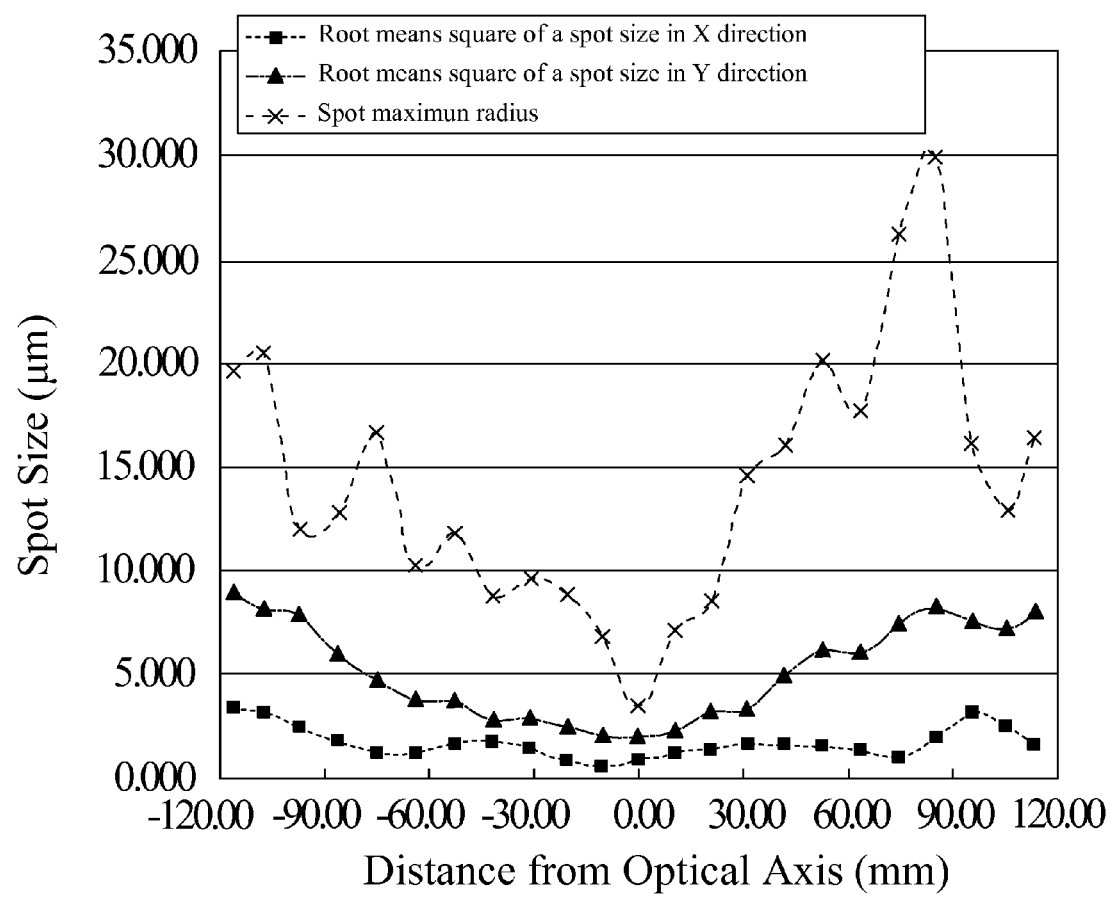
FIG. 7 is a schematic view of a spot distribution on a drum in accordance with a first preferred embodiment of the present invention.
Figure 8:
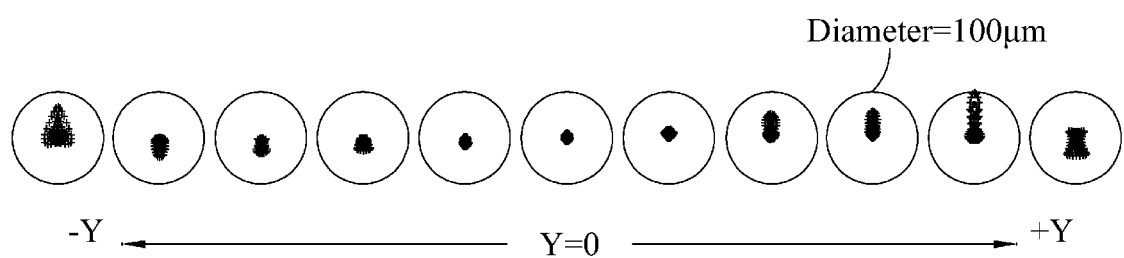
FIG. 8 is a schematic view of the sizes and shapes of spots formed at different positions of the target in accordance with a first preferred embodiment of the present invention.

For the optical surfaces of the aforementioned two-element fθ lens with short focal distance, $f_{(1)Y}$=118.315, $f_{(2)Y}$=22389.4 (mm), $y_a$=71.50, $y_b$=53.47 (mm), allows for a maximum window angle β=37.01°, such that a spot on the polygon mirror 10 can be scanned to form and focus a scanning light onto a drum 15 to form a smaller spot 6 and satisfies the conditions of Equations (4)~(6) and Equation (7)~(9) as shown in Table 3, and the diameter (μm) of a geometric spot formed on the drum and along the z-axis of the central axis on 15 and the Y distance (mm) of a spot formed on the central axis of the Y direction are shown in Table 4, and the distribution, spot size and shape of the spots of this preferred embodiment are shown in FIGS. 7 and 8.

TABLE 3

List of Conditions Satisfied by First Preferred Embodiment

| $\dfrac{d_1 + d_3 + d_5}{f_s}$ | 3.4292 |
|---|---|

TABLE 3-continued

List of Conditions Satisfied by First Preferred Embodiment

| $\tan(\beta) = \dfrac{y_b}{y_a}$ | 0.7538 |
|---|---|
| main scanning direction | 0.1358 |
| $\left\| f_s \cdot \left( \dfrac{(n_{d1} - 1)}{f_{(1)y}} + \dfrac{(n_{d2} - 1)}{f_{(2)y}} \right) \right\|$ |  |
| $\delta = \dfrac{\min(S_{max,Y})}{\max(S_{max,Y})}$ | 0.11 |
| $\eta_{max} = \dfrac{\max(S_b \cdot S_a)}{(S_{b0} \cdot S_{a0})}$ | 0.0023 |
| $\eta_{min} = \dfrac{\min(S_b \cdot S_a)}{(S_{b0} \cdot S_{a0})}$ | 0.00008 |

TABLE 4

List of Maximum Spot Radius and Root Means Square Radius of first preferred embodiment

| Y(mm) | 113.17 | 105.27 | 95.38 | 85.01 | 74.29 | 63.39 | 52.46 | 41.66 | 31.03 | 20.58 | 10.26 | 0.00 |
|---|---|---|---|---|---|---|---|---|---|---|---|---|
| Max. Spot Radius(μm) | 10.692 | 8.462 | 10.546 | 19.587 | 17.175 | 11.579 | 13.160 | 10.427 | 6.220 | 3.614 | 3.052 | 2.206 |
| RMS Spot Radius(μm) | 4.128 | 4.015 | 4.382 | 6.398 | 5.666 | 4.638 | 4.728 | 3.897 | 2.711 | 1.880 | 1.417 | 1.150 |

Figure 9:
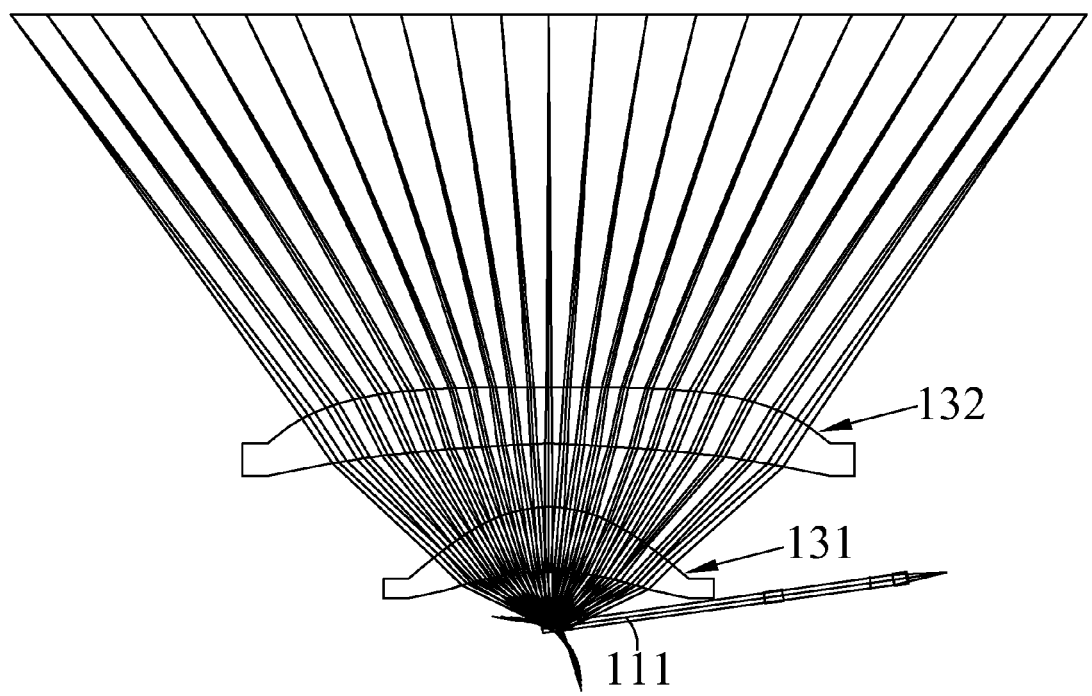
FIG. 9 is a schematic view of optical paths in accordance with a second preferred embodiment of the present invention.

In a second preferred embodiment, the two-element fθ lens with short focal distance in accordance with this preferred embodiment comprises a first lens 131 having a second optical surface 131b and a second lens 132 having a third optical surface 132a, and these optical surfaces 131b, 132a are aspherical surfaces which are optical surfaces designed by Equation (3), and a first optical surface 131a of the first lens 131 and a fourth optical surface 132b of the second lens 132 in the main scanning direction are aspherical surfaces which are optical surfaces designed by Equation (2). The optical characteristic and the parameters of the aspherical surfaces are listed in Tables 5 and 6, and an optical path diagram is shown in FIG. 9, and an inflection point of the fourth optical surface 132b is situated at an angle of $\phi=6.47°$.

TABLE 5

List of Optical Properties of fθ lens of Second Preferred Embodiment
fs = 28.954

| optical surface | Radius (mm) | Thickness d (mm) | refraction index $n_d$ |
|---|---|---|---|
| reflecting mirror reflecting surface R0 | ∞ | 12.00 | 1 |
| lens 1 | | | 1.529 |
| R1(Toric) | | | |
| R1x | ∞ | 13.96 | |
| R1y* | −56.141 | | |
| R2(Ext. polynomial) | | | |
| R2x* | −31.111 | 13.56 | |
| R2y* | −31.111 | | |
| lens 2 | | | 1.529 |
| R3(Ext. polynomial) | | | |
| R3x* | −140.361 | 12.06 | |
| R3y* | −140.361 | | |
| R4(Toric) | | | |
| R4x | −37.540 | 79.73 | |
| R4y* | 6098.953 | | |
| drum R5 | ∞ | 0.0 | |

*aspherical surface

TABLE 6(A)

List of Parameters of Aspherical Surface of Optical Surface For Second Preferred Embodiment

| | Toric Equation Coefficient | | | | | |
|---|---|---|---|---|---|---|
| Optical Surface | Conic Coefficient (Ky) | 4th Order Coefficient (B4) | 6th Order Coefficient (B6) | 8th Order Coefficient (B8) | 10th Order Coefficient (B10) |
| R1* | 3.5663E−01 | 3.0005E−06 | 5.6757E−10 | 2.2990E−13 | −4.2545E−17 |
| R4* | 1.3628E+04 | −9.5217E−07 | 2.3670E−11 | 3.8344E−15 | −1.2502E−18 |

TABLE 6(B)

List of Parameters of Aspherical Surface of Optical Surface of Second Preferred Embodiment

| R2* | Extend Polynomial Equation Coefficient | | | | | | | | K (Conic Coefficient) = −0.9249 |
|---|---|---|---|---|---|---|---|---|---|
| Ai | $Y^0$ | $Y^1$ | $Y^2$ | $Y^3$ | $Y^4$ | $Y^5$ | $Y^6$ | $Y^7$ | $Y^8$ |
| $X^0$ | | 0.0000E+00 | 0.0000E+00 | −1.9930E−06 | −8.5886E−07 | 9.1026E−10 | 7.2638E−10 | 0.0000E+00 | 2.2584E−12 |
| $X^1$ | 0.0000E+00 | 0.0000E+00 | 0.0000E+00 | 0.0000E+00 | 0.0000E+00 | 0.0000E+00 | 0.0000E+00 | 0.0000E+00 | |
| $X^2$ | −2.9943E−02 | 7.7281E−06 | −1.0138E−05 | −3.8900E−08 | 3.7329E−09 | 0.0000E+00 | 3.2710E−11 | | |
| $X^3$ | 0.0000E+00 | 0.0000E+00 | 0.0000E+00 | 0.0000E+00 | 0.0000E+00 | 0.0000E+00 | | | |
| $X^4$ | −5.5330E−04 | 2.0380E−05 | 7.1158E−07 | 0.0000E+00 | 2.8910E−09 | | | | |
| $X^5$ | 0.0000E+00 | 0.0000E+00 | 0.0000E+00 | 0.0000E+00 | | | | | |
| $X^6$ | 0.0000E+00 | 0.0000E+00 | 0.0000E+00 | | | | | | |
| $X^7$ | 0.0000E+00 | 0.0000E+00 | | | | | | | |
| $X^8$ | 0.0000E+00 | | | | | | | | |

TABLE 6(B)-continued

List of Parameters of Aspherical Surface of Optical Surface of Second Preferred Embodiment

| R3* | Extend Polynomial Equation Coefficient | | | | | | K (Conic Coefficent) = −63.4652 | | |
|---|---|---|---|---|---|---|---|---|---|
| Ai | $Y^0$ | $Y^1$ | $Y^2$ | $Y^3$ | $Y^4$ | $Y^5$ | $Y^6$ | $Y^7$ | $Y^8$ |
| $X^0$ | | 0.0000E+00 | 0.0000E+00 | −1.0018E−06 | −5.2104E−08 | 1.1013E−10 | −9.1657E−12 | 0.0000E+00 | −1.2660E−15 |
| $X^1$ | 0.0000E+00 | 0.0000E+00 | 0.0000E+00 | 0.0000E+00 | 0.0000E+00 | 0.0000E+00 | 0.0000E+00 | 0.0000E+00 | |
| $X^2$ | −2.0642E−04 | −1.0233E−04 | 4.6064E−07 | 1.8471E−08 | −1.7143E−10 | 0.0000E+00 | 1.8262E−14 | | |
| $X^3$ | 0.0000E+00 | 0.0000E+00 | 0.0000E+00 | 0.0000E+00 | 0.0000E+00 | 0.0000E+00 | | | |
| $X^4$ | −3.7941E−04 | 9.2494E−06 | 1.4713E−07 | 0.0000E+00 | 1.2336E−10 | | | | |
| $X^5$ | 0.0000E+00 | 0.0000E+00 | 0.0000E+00 | 0.0000E+00 | | | | | |
| $X^6$ | 0.0000E+00 | 0.0000E+00 | 0.0000E+00 | | | | | | |
| $X^7$ | 0.0000E+00 | 0.0000E+00 | | | | | | | |
| $X^8$ | 0.0000E+00 | | | | | | | | |

Figure 10:
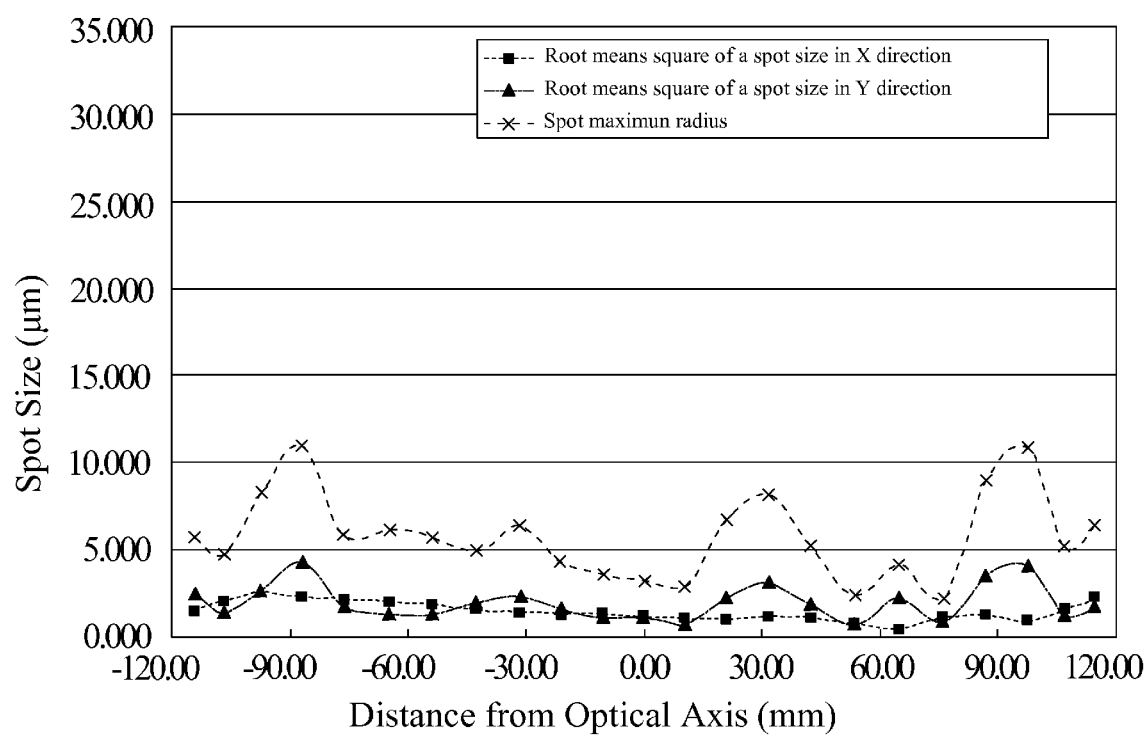
FIG. 10 is a schematic view of a spot distribution on a drum in accordance with a second preferred embodiment of the present invention.
Figure 11:
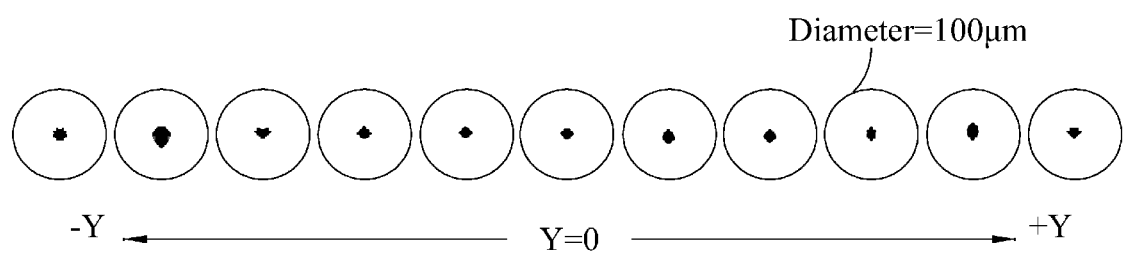
FIG. 11 is a schematic view of the sizes and shapes of spots formed at different positions of the target in accordance with a second preferred embodiment of the present invention.

For the optical surfaces of the aforementioned two-element fθ lens with short focal distance, $f_{(1)Y}$=89.253, $f_{(2)Y}$=−306.107 (mm), $y_a$=79.73, $y_b$=55.15 (mm), and the maximum window angle β=34.673°, such that a spot on the polygon mirror 10 can be scanned to form and focus a scanning light onto a drum 15 to form a smaller spot 6 and satisfy the conditions of Equations (4)~(6) and Equation (7)~(9) as shown in Table 7, and the diameter (μm) of a geometric spot formed on the drum and along the z-axis of the central axis on 15 and the Y distance (mm) of a spot formed on the central axis of the Y direction are shown in Table 8, and the distribution and the spot size and shape of the spots of this preferred embodiment are shown in FIGS. 10 and 11.

Figure 12:
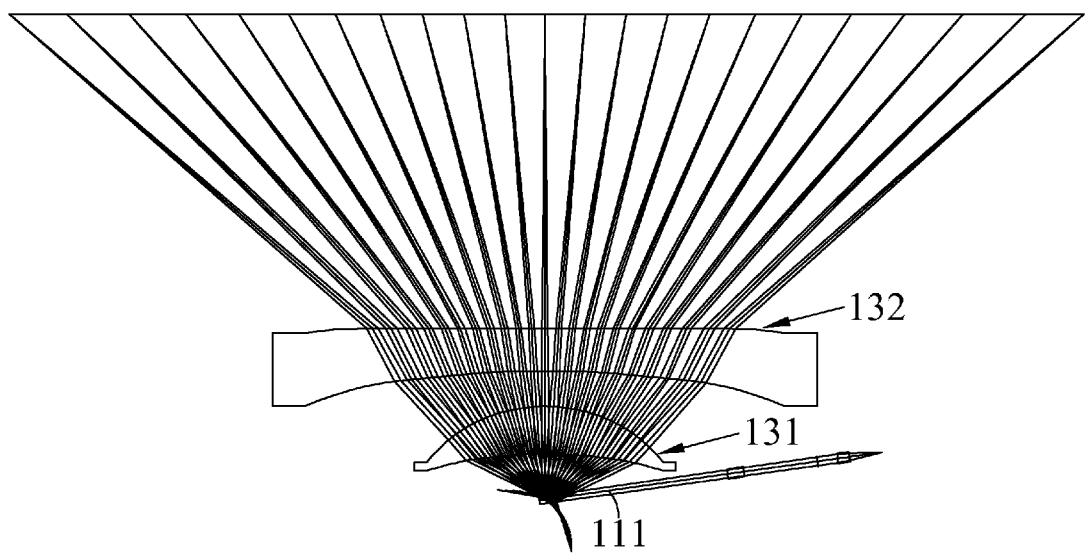
FIG. 12 is a schematic view of optical paths in accordance with a third preferred embodiment of the present invention.

In a third preferred embodiment, the two-element fθ lens with short focal distance in accordance with this preferred embodiment comprises a first lens 131 having a second optical surface 131b and a second lens 132 having a third optical surface 132a, and these optical surfaces 131b, 132a are aspherical surfaces which are optical surfaces designed by Equation (3), and a first optical surface 131a of the first lens 131 and a fourth optical surface 132b of the second lens 132 in the main scanning direction are aspherical surfaces which are optical surfaces designed by Equation (2). The optical characteristic and the parameters of the aspherical surfaces are listed in Tables 9 and 10, and an optical path diagram is shown in FIG. 12, and an inflection point of the fourth optical surface 132b is situated at an angle of φ=31.86°.

TABLE 7

List of Conditions Satisfied by Second Preferred Embodiment

| | |
|---|---|
| $\dfrac{d_1 + d_3 + d_5}{f_s}$ | 3.6365 |
| $\tan(\beta) = \dfrac{y_b}{y_a}$ | 0.6917 |
| main scanning direction $\left\| f_s \cdot \left( \dfrac{(n_{d1} - 1)}{f_{(1)y}} + \dfrac{(n_{d2} - 1)}{f_{(2)y}} \right) \right\|$ | 0.1216 |
| $\delta = \dfrac{\min(S_{max,Y})}{\max(S_{max,Y})}$ | 0.21 |
| $\eta_{max} = \dfrac{\max(S_b \cdot S_a)}{(S_{b0} \cdot S_{a0})}$ | 0.0021 |
| $\eta_{min} = \dfrac{\min(S_b \cdot S_a)}{(S_{b0} \cdot S_{a0})}$ | 0.00012 |

TABLE 9

List of Optical Properties of fθ lens of Third Preferred Embodiment
fs = 27.043

| Optical surface | Radius (mm) | Thickness d (mm) | refraction index $n_d$ |
|---|---|---|---|
| reflecting mirror reflecting surface R0 | ∞ | 11.50 | 1 |
| lens 1 | | | 1.607 |
| R1(Toric) | | | |
| R1x | ∞ | 12.08 | |
| R1y* | −177.893 | | |
| R2(Ext. polynomial) | | | |
| R2x* | −40.553 | 8.89 | |
| R2y* | −40.553 | | |
| lens 2 | | | 1.607 |
| R3(Ext. polynomial) | | | |
| R3x* | −210.675 | 10.84 | |
| R3y* | −210.675 | | |

TABLE 8

List of Maximum Spot Radius and Root Means Square Radius of Second Preferred Embodiment

| Y(mm) | 114.64 | 107.19 | 97.50 | 87.04 | 76.06 | 64.84 | 53.62 | 42.55 | 31.69 | 21.02 | 10.48 | 0.00 |
|---|---|---|---|---|---|---|---|---|---|---|---|---|
| Max. Spot Radius(μm) | 6.428 | 5.183 | 10.919 | 8.992 | 2.324 | 4.215 | 2.410 | 5.249 | 8.179 | 6.748 | 2.989 | 3.270 |
| RMS Spot Radius(μm) | 2.853 | 2.067 | 4.140 | 3.704 | 1.475 | 2.284 | 1.081 | 2.195 | 3.301 | 2.554 | 1.300 | 1.676 |

TABLE 9-continued

List of Optical Properties of fθ lens of Third Preferred Embodiment
fs = 27.043

| Optical surface | Radius (mm) | Thickness d (mm) | refraction index $n_d$ |
|---|---|---|---|
| R4(Toric) | | | |
| R4x | ∞ | 79.34 | |
| R4y* | 32522.536 | | |
| drum (drum)R5 | ∞ | 0.0 | |

*aspherical surface

Figure 13:
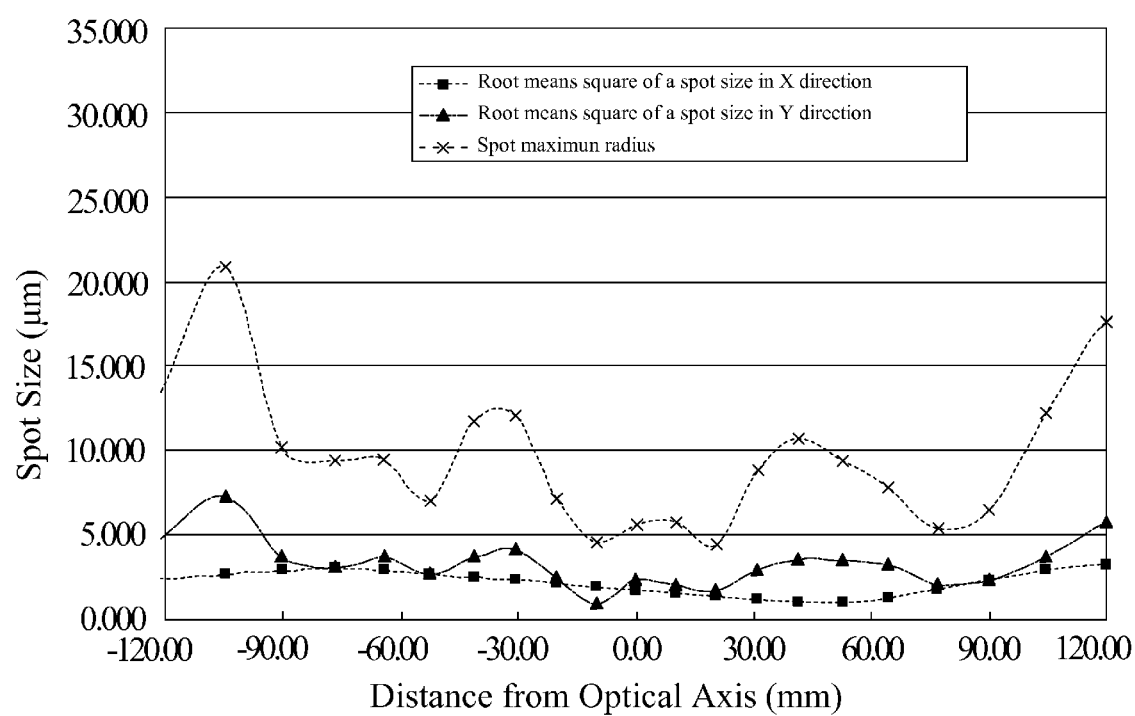
FIG. 13 is a schematic view of a spot distribution on a drum in accordance with a third preferred embodiment of the present invention.
Figure 14:
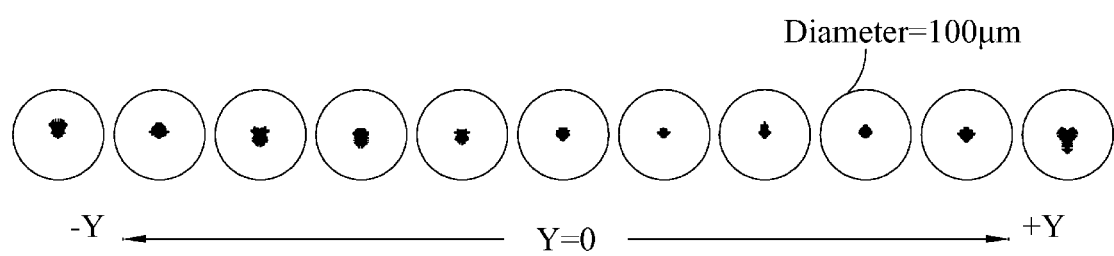
FIG. 14 is a schematic view of the sizes and shapes of spots formed at different positions of the target in accordance with a third preferred embodiment of the present invention.

For the optical surfaces of the aforementioned two-element fθ lens with short focal distance, $f_{(1)Y}$=85.306, $f_{(2)Y}$=−281.708 (mm), $y_a$=79.34, $y_b$=88.70 (mm), and the maximum window angle β=48.188°, such that a spot on the polygon mirror 10 can be scanned to form and focus a scanning light onto a drum 15 to form a smaller spot 6 and satisfy the conditions of Equations (4)~(6) and Equation (7)~(9) as shown in Table 11, and the radius (μm) of a geometric spot scanned at a distance from the central axis (z-axis) are shown in Table 12, and the RMS radius of the spot of the scanning light scanned in a Y direction from central axis onto the drum 15. The distribution and the spot size and shape of the spots of this preferred embodiment are shown in FIGS. 13 and 14.

TABLE 10(A)

List of Parameters of Aspherical Surface of Optical Surface For Third Preferred Embodiment

| | | Toric Equation Coefficient | | | |
|---|---|---|---|---|---|
| optical Surface | Conic Coefficient (Ky) | 4th Order Coefficient (B4) | 6th Order Coefficient (B6) | 8th Order Coefficient (B8) | 10th Order Coefficient (B10) |
| R1* | 6.4840E−01 | −1.5823E−07 | −6.9601E−11 | 2.6894E−14 | 4.6031E−17 |
| R4* | −1.9666E+04 | −5.5815E−10 | −4.2780E−12 | −2.0912E−15 | −5.6015E−19 |

TABLE 10(B)

List of Parameters of Aspherical Surface of Optical Surface For Third Preferred Embodiment

| R2* | Extend Polynomial Equation Coefficient | | | | | | | | K (Conic Coefficient) = −0.7280 |
|---|---|---|---|---|---|---|---|---|---|
| Ai | $Y^0$ | $Y^1$ | $Y^2$ | $Y^3$ | $Y^4$ | $Y^5$ | $Y^6$ | $Y^7$ | $Y^8$ |
| $X^0$ | | 0.0000E+00 | 0.0000E+00 | 2.0753E−06 | 1.0713E−06 | −1.5240E−09 | −3.3025E−09 | 0.0000E+00 | 2.6855E−13 |
| $X^1$ | 0.0000E+00 | 0.0000E+00 | 0.0000E+00 | 0.0000E+00 | 0.0000E+00 | 0.0000E+00 | 0.0000E+00 | 0.0000E+00 | |
| $X^2$ | −3.7987E−02 | −1.4690E−07 | 7.5047E−06 | −6.7321E−08 | 9.4893E−09 | 0.0000E+00 | −1.1664E−11 | | |
| $X^3$ | 0.0000E+00 | 0.0000E+00 | 0.0000E+00 | 0.0000E+00 | 0.0000E+00 | 0.0000E+00 | | | |
| $X^4$ | 1.0360E−05 | −3.4901E−05 | 6.6711E−06 | 0.0000E+00 | −1.4726E−08 | | | | |
| $X^5$ | 0.0000E+00 | 0.0000E+00 | 0.0000E+00 | 0.0000E+00 | | | | | |
| $X^6$ | 0.0000E+00 | 0.0000E+00 | 0.0000E+00 | | | | | | |
| $X^7$ | 0.0000E+00 | 0.0000E+00 | | | | | | | |
| $X^8$ | 0.0000E+00 | | | | | | | | |

| R3* | Extend Polynomial Equation Coefficient | | | | | | | | K (Conic Coefficient) = −89.3564 |
|---|---|---|---|---|---|---|---|---|---|
| Ai | $Y^0$ | $Y^1$ | $Y^2$ | $Y^3$ | $Y^4$ | $Y^5$ | $Y^6$ | $Y^7$ | $Y^8$ |
| $X^0$ | | 0.0000E+00 | 0.0000E+00 | 3.0472E−07 | −1.4501E−07 | −4.9068E−11 | −4.3694E−11 | 0.0000E+00 | −1.8932E−15 |
| $X^1$ | 0.0000E+00 | 0.0000E+00 | 0.0000E+00 | 0.0000E+00 | 0.0000E+00 | 0.0000E+00 | 0.0000E+00 | 0.0000E+00 | |
| $X^2$ | 5.7053E−03 | −1.5834E−04 | −9.3054E−07 | 3.2099E−08 | 1.1309E−09 | 0.0000E+00 | −1.4081E−13 | | |
| $X^3$ | 0.0000E+00 | 0.0000E+00 | 0.0000E+00 | 0.0000E+00 | 0.0000E+00 | 0.0000E+00 | | | |
| $X^4$ | 4.0517E−04 | −2.3161E−05 | 6.5077E−07 | 0.0000E+00 | −1.2681E−09 | | | | |
| $X^5$ | 0.0000E+00 | 0.0000E+00 | 0.0000E+00 | 0.0000E+00 | | | | | |
| $X^6$ | 0.0000E+00 | 0.0000E+00 | 0.0000E+00 | | | | | | |
| $X^7$ | 0.0000E+00 | 0.0000E+00 | | | | | | | |
| $X^8$ | 0.0000E+00 | | | | | | | | |

TABLE 11

List of Conditions Satisfied by Third Preferred Embodiment

| | |
|---|---|
| $\dfrac{d_1 + d_3 + d_5}{f_s}$ | 3.6879 |
| $\tan(\beta) = \dfrac{y_b}{y_a}$ | 1.1180 |
| main scanning direction | 0.1341 |
| $\left\| f_s \cdot \left( \dfrac{(n_{d1} - 1)}{f_{(1)y}} + \dfrac{(n_{d2} - 1)}{f_{(2)y}} \right) \right\|$ | |

TABLE 11-continued

List of Conditions Satisfied by Third Preferred Embodiment

| | |
|---|---|
| $\delta = \dfrac{\min(S_{max,Y})}{\max(S_{max,Y})}$ | 0.24 |
| $\eta_{max} = \dfrac{\max(S_b \cdot S_a)}{(S_{b0} \cdot S_{a0})}$ | 0.0041 |
| $\eta_{min} = \dfrac{\min(S_b \cdot S_a)}{(S_{b0} \cdot S_{a0})}$ | 0.00035 |

TABLE 12

List of Maximum Spot Radius and Root Means Square Radius of third preferred embodiment

| Y(mm) | 134.53 | 120.14 | 104.45 | 90.06 | 76.76 | 64.33 | 52.62 | 41.48 | 30.77 | 20.36 | 10.14 | 0.00 |
|---|---|---|---|---|---|---|---|---|---|---|---|---|
| Max. Spot Radius(μm) | 18.276 | 17.720 | 12.150 | 6.538 | 5.355 | 7.810 | 9.391 | 10.683 | 8.825 | 4.359 | 5.729 | 5.651 |
| RMS Spot Radius(μm) | 7.478 | 6.545 | 4.622 | 3.210 | 2.677 | 3.429 | 3.597 | 3.625 | 3.101 | 2.102 | 2.484 | 2.827 |

Figure 15:
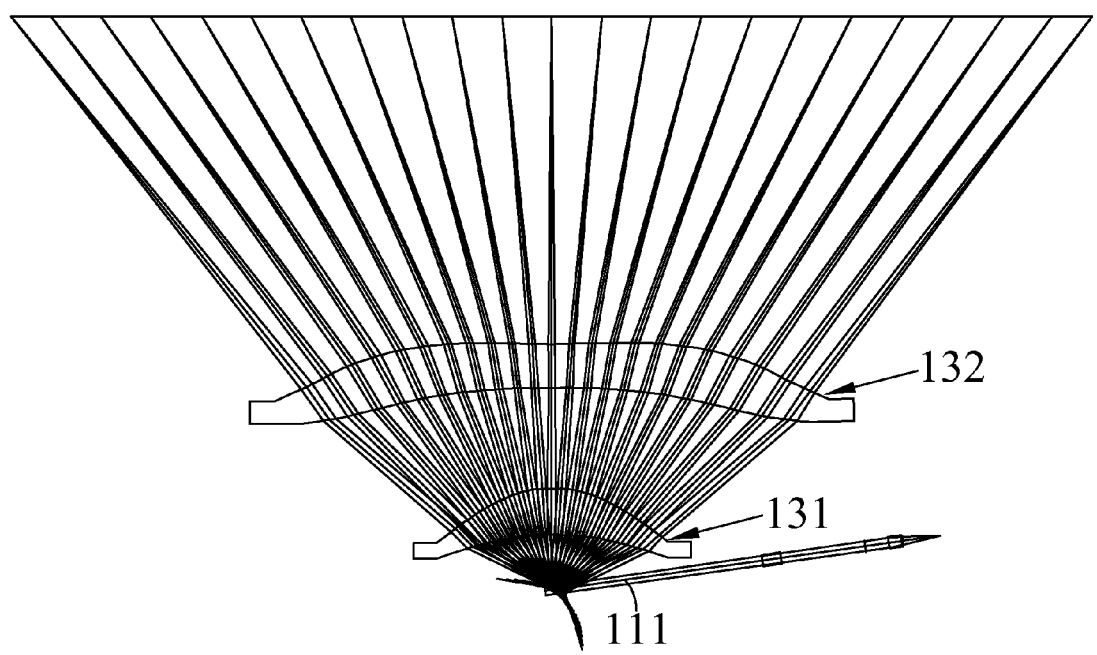
FIG. 15 is a schematic view of optical paths in accordance with a fourth preferred embodiment of the present invention.

In a fourth preferred embodiment, the two-element fθ lens with short focal distance in accordance with this preferred embodiment comprises a first lens 131 having a second optical surface 131*b* and a second lens 132 having a third optical surface 132*a*, and these optical surfaces 131*b*, 132*a* are aspherical surfaces which are optical surfaces designed by Equation (3), and a first optical surface 131*a* of the first lens 131 and a fourth optical surface 132*b* of the second lens 132 in the main scanning direction are aspherical surfaces which are optical surfaces designed by Equation (2). The optical characteristic and the parameters of the aspherical surfaces are listed in Tables 13 and 14, and an optical path diagram is shown in FIG. 15, and an inflection point of the fourth optical surface 132*b* is situated at an angle of ϕ=18.94°.

TABLE 13

List of Optical Properties of fθ lens of Fourth Preferred Embodiment
fs = 21.528

| optical surface | Radius (mm) | Thickness d (mm) | refraction index $n_d$ |
|---|---|---|---|
| reflecting mirror reflecting surface R0 | ∞ | 12.00 | 1 |
| lens 1 | | | 1.529 |
| R1(Toric) | | | |
| R1x | ∞ | 10.00 | |
| R1y* | −60.135 | | |
| R2(Ext. polynomial) | | | |
| R2x* | −52.599 | 22.00 | |
| R2y* | −52.599 | | |
| lens 2 | | | 1.529 |
| R3(Ext. polynomial) | | | |
| R3x* | −229.314 | 9.50 | |
| R3y* | −229.314 | | |
| R4(Toric) | | | |
| R4x | −30.927 | 71.50 | |
| R4y* | 353.231 | | |
| drum (drum)R5 | ∞ | 0.0 | |

*aspherical surface

TABLE 14(A)

List of Parameters of Aspherical Surface of Optical Surface For Fourth Preferred Embodiment Toric Equation Coefficient

| optical Surface | Conic Coefficient (Ky) | 4th Order Coefficient (B4) | 6th Order Coefficient (B6) | 8th Order Coefficient (B8) | 10th Order Coefficient (B10) |
|---|---|---|---|---|---|
| R1* | −1.6797E+00 | 1.3101E−05 | −1.4918E−08 | −5.2543E−12 | 9.1885E−15 |
| R4* | 0.0000E+00 | −3.0013E−06 | 1.3772E−09 | −2.8610E−13 | 8.4676E−17 |

TABLE 14(B)

List of Parameters of Aspherical Surface of Optical Surface of Fourth Preferred Embodiment R2*  Extend Polynomial Equation Coefficient  K (Conic Coefficient) = −0.4639

| Ai | $Y^0$ | $Y^1$ | $Y^2$ | $Y^3$ | $Y^4$ | $Y^5$ | $Y^6$ | $Y^7$ | $Y^8$ |
|---|---|---|---|---|---|---|---|---|---|
| $X^0$ |  | 0.0000E+00 | 0.0000E+00 | 0.0000E+00 | 4.5373E−06 | −3.7957E−10 | 9.0189E−09 | 0.0000E+00 | −7.9328E−12 |
| $X^1$ | 0.0000E+00 | 0.0000E+00 | 0.0000E+00 | 0.0000E+00 | 0.0000E+00 | 0.0000E+00 | 0.0000E+00 | 0.0000E+00 |  |
| $X^2$ | −2.1759E−02 | 2.1652E−05 | 2.0400E−06 | −5.6894E−08 | −6.3789E−10 | 0.0000E+00 | 3.6817E−11 |  |  |
| $X^3$ | 0.0000E+00 | 0.0000E+00 | 0.0000E+00 | 0.0000E+00 | 0.0000E+00 | 0.0000E+00 |  |  |  |
| $X^4$ | 3.2070E−04 | 6.2625E−07 | 2.7400E−07 | 0.0000E+00 | −6.7428E−10 |  |  |  |  |
| $X^5$ | 0.0000E+00 | 0.0000E+00 | 0.0000E+00 | 0.0000E+00 |  |  |  |  |  |
| $X^6$ | 0.0000E+00 | 0.0000E+00 | 0.0000E+00 |  |  |  |  |  |  |
| $X^7$ | 0.0000E+00 | 0.0000E+00 |  |  |  |  |  |  |  |
| $X^8$ | 0.0000E+00 |  |  |  |  |  |  |  |  |

R3*  Extend Polynomial Equation Coefficient  K (Conic Coefficient) = 2.5574

| Ai | $Y^0$ | $Y^1$ | $Y^2$ | $Y^3$ | $Y^4$ | $Y^5$ | $Y^6$ | $Y^7$ | $Y^8$ |
|---|---|---|---|---|---|---|---|---|---|
| $X^0$ |  | 0.0000E+00 | 0.0000E+00 | −1.3559E−06 | −1.0662E−06 | 2.2390E−10 | 4.9804E−10 | 0.0000E+00 | −4.4416E−14 |
| $X^1$ | 0.0000E+00 | 0.0000E+00 | 0.0000E+00 | 0.0000E+00 | 0.0000E+00 | 0.0000E+00 | 0.0000E+00 | 0.0000E+00 |  |
| $X^2$ | 8.0011E−03 | −6.7288E−05 | −1.8560E−06 | 9.1716E−09 | −9.1934E−10 | 0.0000E+00 | 6.4148E−14 |  |  |
| $X^3$ | 0.0000E+00 | 0.0000E+00 | 0.0000E+00 | 0.0000E+00 | 0.0000E+00 | 0.0000E+00 |  |  |  |
| $X^4$ | −1.4656E−05 | 9.2676E−07 | 4.7948E−08 | 0.0000E+00 | −2.3235E−11 |  |  |  |  |
| $X^5$ | 0.0000E+00 | 0.0000E+00 | 0.0000E+00 | 0.0000E+00 |  |  |  |  |  |
| $X^6$ | 0.0000E+00 | 0.0000E+00 | 0.0000E+00 |  |  |  |  |  |  |
| $X^7$ | 0.0000E+00 | 0.0000E+00 |  |  |  |  |  |  |  |
| $X^8$ | 0.0000E+00 |  |  |  |  |  |  |  |  |

Figure 16:
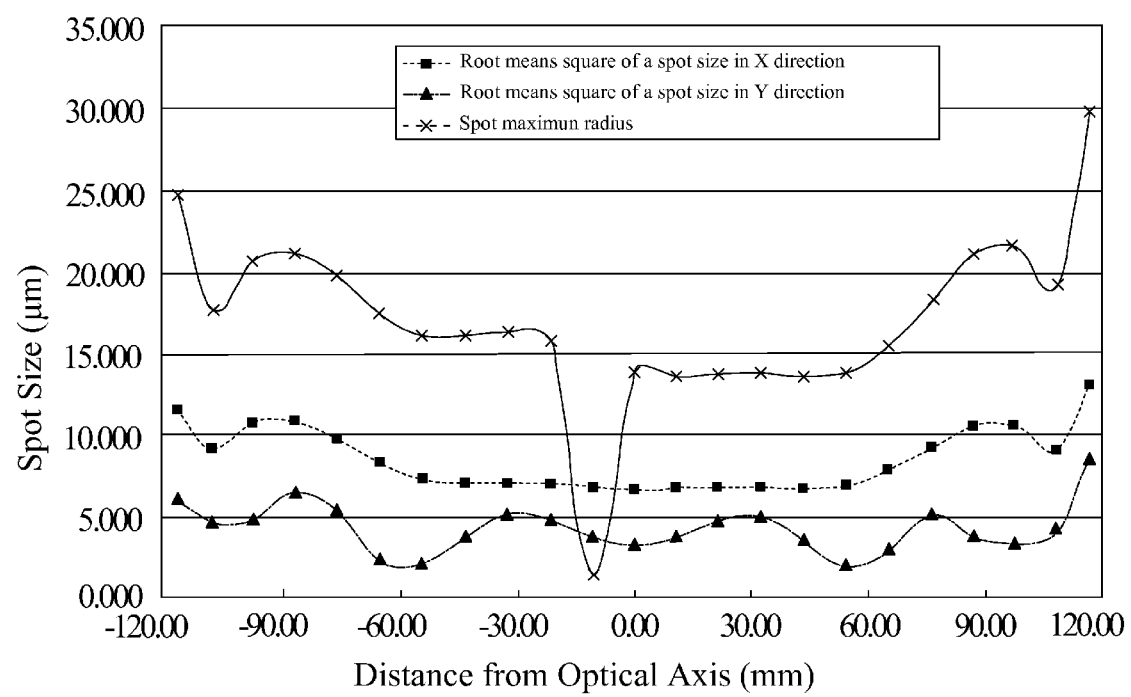
FIG. 16 is a schematic view of a spot distribution on a drum in accordance with a fourth preferred embodiment of the present invention.
Figure 17:
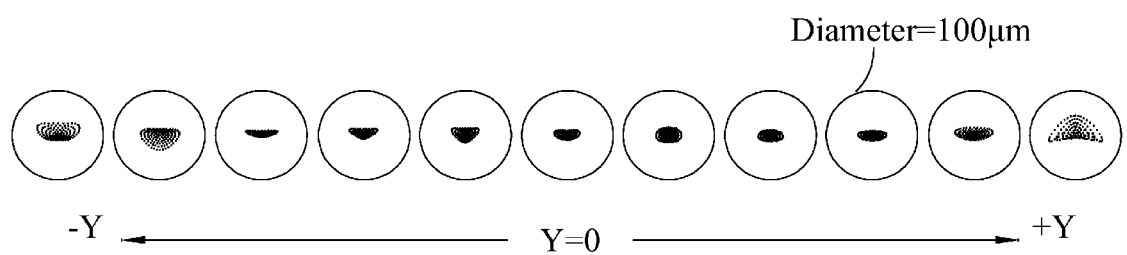
FIG. 17 is a schematic view of the sizes and shapes of spots formed at different positions of the target in accordance with a fourth preferred embodiment of the present invention.

For the optical surfaces of the aforementioned two-element fθ lens with short focal distance, $f_{(1)Y}$=89.817, $f_{(2)Y}$=232.765 (mm), $y_a$=71.50, $y_b$=53.468 (mm), and the maximum window angle β=36.789°, such that a spot on the polygon mirror 10 can be scanned to form and focus a scanning light onto a drum 15 to form a smaller spot 6 and satisfy the conditions of Equations (4)~(6) and Equation (7)~(9) as shown in Table 15, and radius (μm) of a geometric spot scanned at a distance from the central axis (z-axis) are shown in Table 16, and the RMS radius of the spot of the scanning light scanned in a Y direction from central axis onto the drum 15. The distribution and the spot size and shape of the spots of this preferred embodiment are shown in FIGS. 16 and 17.

TABLE 15

List of Conditions Satisfied by Fourth Preferred Embodiment

| | |
|---|---|
| $\dfrac{d_1 + d_3 + d_5}{f_s}$ | 4.9006 |
| $\tan(\beta) = \dfrac{y_b}{y_a}$ | 0.7478 |

TABLE 15-continued

List of Conditions Satisfied by Fourth Preferred Embodiment

| | |
|---|---|
| main scanning direction | 0.0779 |
| $\left\| f_s \cdot \left( \dfrac{(n_{d1} - 1)}{f_{(1)y}} + \dfrac{(n_{d2} - 1)}{f_{(2)y}} \right) \right\|$ | |
| $\delta = \dfrac{\min(S_{max,Y})}{\max(S_{max,Y})}$ | 0.46 |
| $\eta_{max} = \dfrac{\max(S_b \cdot S_a)}{(S_{b0} \cdot S_{a0})}$ | 0.0233 |
| $\eta_{min} = \dfrac{\min(S_b \cdot S_a)}{(S_{b0} \cdot S_{a0})}$ | 0.0028 |

TABLE 16

List of Maximum Spot Radius and Root Means Square Radius of fourth preferred embodiment

| Y(mm) | 116.88 | 108.26 | 97.69 | 86.96 | 76.14 | 65.28 | 54.38 | 43.43 | 32.48 | 21.57 | 10.76 | 0.00 |
|---|---|---|---|---|---|---|---|---|---|---|---|---|
| Max. Spot Radius(μm) | 29.722 | 19.256 | 21.576 | 21.001 | 18.266 | 15.438 | 13.833 | 13.628 | 13.843 | 13.692 | 13.545 | 13.853 |
| RMS Spot Radius(μm) | 15.611 | 9.971 | 11.092 | 11.160 | 10.538 | 8.338 | 7.187 | 7.588 | 8.417 | 8.274 | 7.671 | 7.426 |

Figure 18:
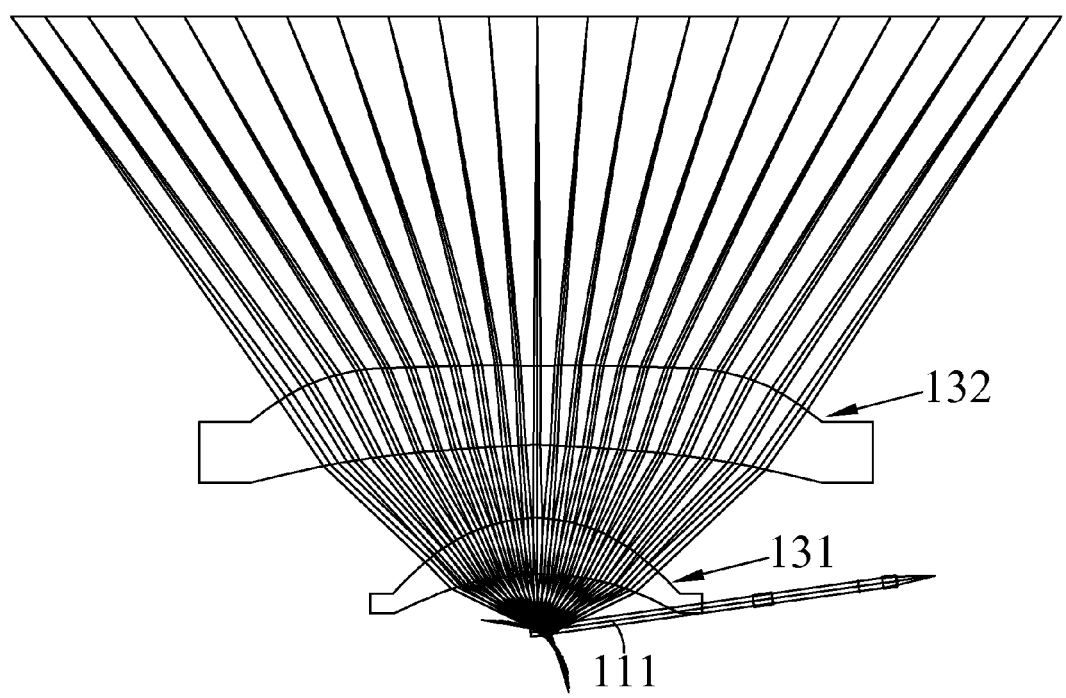
FIG. 18 is a schematic view of optical paths in accordance with a fifth preferred embodiment of the present invention.

In a fifth preferred embodiment, the two-element fθ lens with short focal distance in accordance with this preferred embodiment comprises a first lens 131 having a second optical surface 131b and a second lens 132 having a third optical surface 132a, and these optical surfaces 131b, 132a are aspherical surfaces which are optical surfaces designed by Equation (3), and a first optical surface 131a of the first lens 131 and a fourth optical surface 132b of the second lens 132 in the main scanning direction are aspherical surfaces which are optical surfaces designed by Equation (2). The optical characteristic and the parameters of the aspherical surfaces are listed in Tables 17 and 18, and an optical path diagram is shown in FIG. 18, and an inflection point of the fourth optical surface 132b is situated at an angle of ϕ=9.60°.

TABLE 17

List of Optical Properties of fθ lens of Fifth Preferred Embodiment
fs = 27.457

| optical surface | Radius (mm) | Thickness d (mm) | refraction index $n_d$ |
|---|---|---|---|
| reflecting mirror reflecting surface R0 | ∞ | 11.50 | 1 |
| lens 1 | | | 1.607 |
| R1(Toric) | | | |
| R1x | ∞ | 12.30 | |
| R1y* | −66.864 | | |
| R2(Ext. polynomial) | | | |
| R2x* | −25.656 | 15.30 | |
| R2y* | −25.656 | | |
| lens 2 | | | 1.529 |
| R3(Ext. polynomial) | | | |
| R3x* | −116.923 | 16.94 | |
| R3y* | −116.923 | | |
| R4(Toric) | | | |
| R4x | ∞ | 72.69 | |
| R4y* | 4331.455 | | |
| drum (drum)R5 | ∞ | 0.0 | |

*aspherical surface

TABLE 18(A)

List of Parameters of Aspherical Surface of Optical Surface of Fifth Preferred Embodiment

| | Toric Equation Coefficient | | | | |
|---|---|---|---|---|---|
| optical Surface | Conic Coefficient (Ky) | 4th Order Coefficient (B4) | 6th Order Coefficient (B6) | 8th Order Coefficient (B8) | 10th Order Coefficient (B10) |
| R1* | −5.3352E−01 | 8.6041E−07 | −9.7060E−10 | 1.7705E−12 | −6.6323E−16 |
| R4* | −3.8593E+04 | −5.9560E−07 | 1.1700E−10 | −1.0388E−14 | −2.1561E−18 |

TABLE 18(B)

List of Parameters of Aspherical Surface of Optical Surface for Fifth Preferred Embodiment R2*  Extend Polynomial Equation Coefficient  K (Conic Coefficient) = −0.5144

| Ai | $Y^0$ | $Y^1$ | $Y^2$ | $Y^3$ | $Y^4$ | $Y^5$ | $Y^6$ | $Y^7$ | $Y^8$ |
|---|---|---|---|---|---|---|---|---|---|
| $X^0$ | | 0.0000E+00 | 0.0000E+00 | −1.8562E−06 | 1.2202E−06 | −6.9803E−10 | −2.4190E−09 | 0.0000E+00 | 2.1196E−12 |
| $X^1$ | 0.0000E+00 | 0.0000E+00 | 0.0000E+00 | 0.0000E+00 | 0.0000E+00 | 0.0000E+00 | 0.0000E+00 | 0.0000E+00 | |
| $X^2$ | −3.6861E−02 | −2.1078E−04 | −1.9113E−06 | −2.2804E−07 | 1.3559E−08 | 0.0000E+00 | 2.0171E−11 | | |
| $X^3$ | 0.0000E+00 | 0.0000E+00 | 0.0000E+00 | 0.0000E+00 | 0.0000E+00 | 0.0000E+00 | | | |
| $X^4$ | 1.3243E−04 | 4.6374E−05 | −3.4277E−07 | 0.0000E+00 | 3.8499E−09 | | | | |
| $X^5$ | 0.0000E+00 | 0.0000E+00 | 0.0000E+00 | 0.0000E+00 | | | | | |
| $X^6$ | 0.0000E+00 | 0.0000E+00 | 0.0000E+00 | | | | | | |
| $X^7$ | 0.0000E+00 | 0.0000E+00 | | | | | | | |
| $X^8$ | 0.0000E+00 | | | | | | | | |

TABLE 18(B)-continued

List of Parameters of Aspherical Surface of Optical Surface for Fifth Preferred Embodiment

| R3* | Extend Polynomial Equation Coefficient | | | | | | K (Conic Coefficient) = −59.0317 | | |
|---|---|---|---|---|---|---|---|---|---|
| Ai | $Y^0$ | $Y^1$ | $Y^2$ | $Y^3$ | $Y^4$ | $Y^5$ | $Y^6$ | $Y^7$ | $Y^8$ |
| $X^0$ |  | 0.0000E+00 | 0.0000E+00 | −2.5899E−06 | −2.5615E−07 | 3.2909E−10 | −4.9254E−11 | 0.0000E+00 | 1.5806E−14 |
| $X^1$ | 0.0000E+00 | 0.0000E+00 | 0.0000E+00 | 0.0000E+00 | 0.0000E+00 | 0.0000E+00 | 0.0000E+00 | 0.0000E+00 | |
| $X^2$ | 3.0779E−03 | −3.9453E−04 | 1.3662E−06 | 7.7304E−08 | 2.0341E−10 | 0.0000E+00 | 1.1167E−14 | | |
| $X^3$ | 0.0000E+00 | 0.0000E+00 | 0.0000E+00 | 0.0000E+00 | 0.0000E+00 | 0.0000E+00 | | | |
| $X^4$ | −2.4190E−06 | 6.4245E−05 | 2.0270E−06 | 0.0000E+00 | −3.0853E−10 | | | | |
| $X^5$ | 0.0000E+00 | 0.0000E+00 | 0.0000E+00 | 0.0000E+00 | | | | | |
| $X^6$ | 0.0000E+00 | 0.0000E+00 | 0.0000E+00 | | | | | | |
| $X^7$ | 0.0000E+00 | 0.0000E+00 | | | | | | | |
| $X^8$ | 0.0000E+00 | | | | | | | | |

Figure 19:
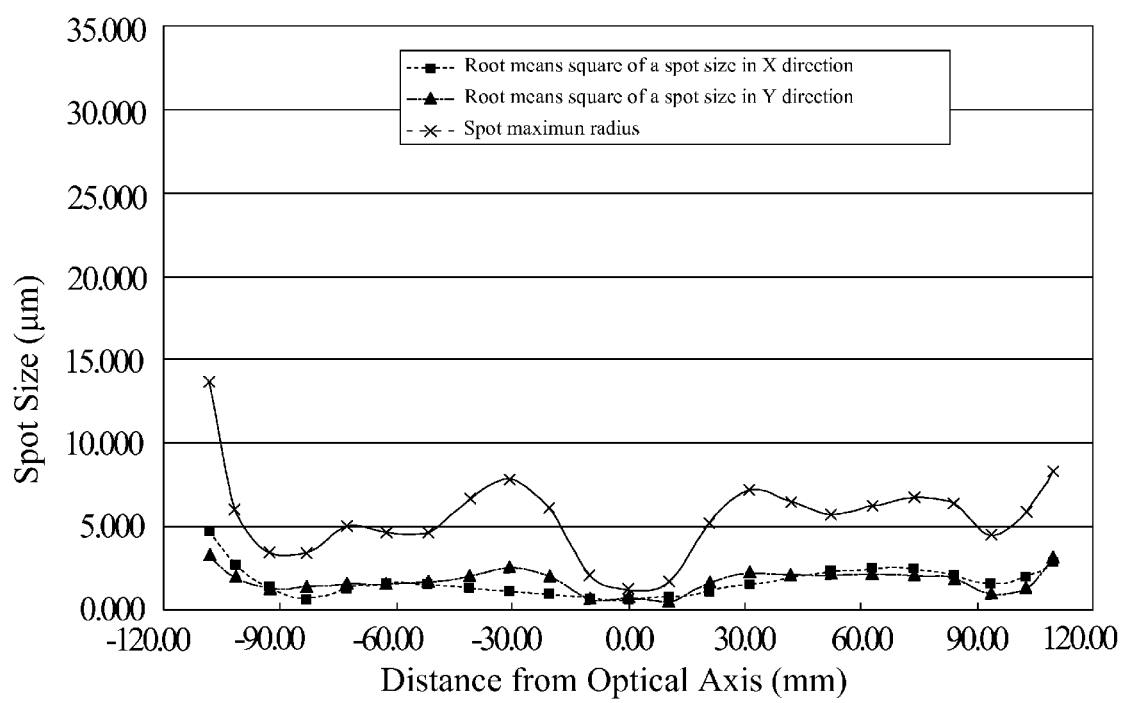
FIG. 19 is a schematic view of a spot distribution on a drum in accordance with a fifth preferred embodiment of the present invention.
Figure 20:
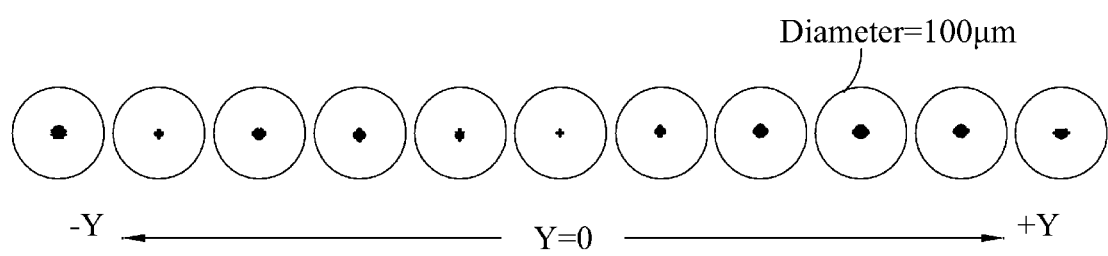
FIG. 20 is a schematic view of the sizes and shapes of spot formed at different positions of the target in accordance with a fifth preferred embodiment of the present invention.

For the optical surfaces of the aforementioned two-element fθ lens with short focal distance, $f_{(1)Y}$=89.834, $f_{(2)Y}$=−314.630 (mm), $y_a$=72.694, $y_b$=48.158 (mm), and the maximum window angle β=33.523°, such that a spot on the polygon mirror 10 can be scanned to form and focus a scanning light onto a drum 15 to form a smaller spot 6 and satisfy the conditions of Equations (4)~(6) and Equation (7)~(9) as shown in Table 19, and the radius (μm) of a geometric spot scanned at a distance from the central axis (z-axis) are shown in Table 20, and the RMS radius of the spot of the scanning light scanned in a Y direction from central axis onto the drum 15, and the distribution and the spot size and shape of the spots of this preferred embodiment are shown in FIGS. 19 and 20.

Figure 21:
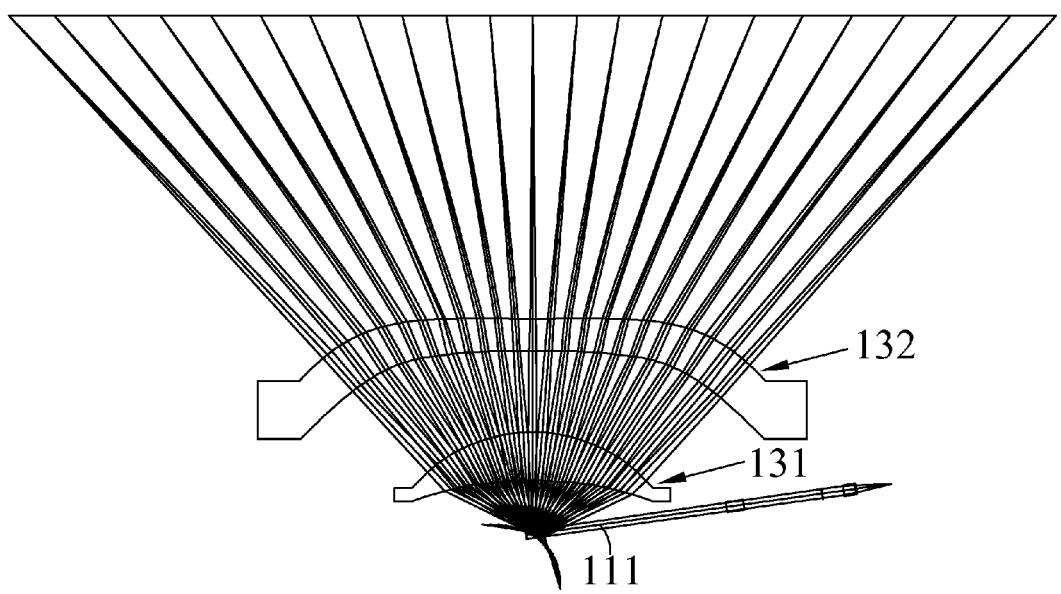
FIG. 21 is a schematic view of optical paths in accordance with a sixth preferred embodiment of the present invention.

In a sixth preferred embodiment, the two-element fθ lens with short focal distance in accordance with this preferred embodiment comprises a first lens 131 having a second optical surface 131b and a second lens 132 having a third optical surface 132a, and these optical surfaces 131b, 132a are aspherical surfaces which are optical surfaces designed by Equation (3), and a first optical surface 131a of the first lens 131 and a fourth optical surface 132b of the second lens 132 in the main scanning direction are aspherical surfaces which are optical surfaces designed by Equation (2). The optical characteristic and the parameters of the aspherical surfaces are listed in Tables 21 and 22, and an optical path diagram is shown in FIG. 21, and an inflection point of the fourth optical surface 132b is situated at an angle of φ=13.07°.

TABLE 19

| List of Conditions Satisfied by Fifth Preferred Embodiment | |
|---|---|
| $\dfrac{d_1 + d_3 + d_5}{f_s}$ | 3.6235 |
| $\tan(\beta) = \dfrac{y_b}{y_a}$ | 0.6625 |
| main scanning direction | 0.1393 |
| $\left\| f_s \cdot \left( \dfrac{(n_{d1} - 1)}{f_{(1)y}} + \dfrac{(n_{d2} - 1)}{f_{(2)y}} \right) \right\|$ | |
| $\delta = \dfrac{\min(S_{max,Y})}{\max(S_{max,Y})}$ | 0.14 |
| $\eta_{max} = \dfrac{\max(S_b \cdot S_a)}{(S_{b0} \cdot S_{a0})}$ | 0.0031 |
| $\eta_{min} = \dfrac{\min(S_b \cdot S_a)}{(S_{b0} \cdot S_{a0})}$ | 0.000062 |

TABLE 21

List of Optical Properties of fθ lens of Sixth Preferred Embodiment
fs = 34.163

| optical surface | Radius (mm) | Thickness d (mm) | refraction index $n_d$ |
|---|---|---|---|
| reflecting mirror reflecting surface R0 | ∞ | 11.50 | 1 |
| lens 1 | | | 1.607 |
| R1(Toric) | | | |
| R1x | ∞ | 10.43 | |
| R1y* | −86.447 | | |
| R2(Ext. polynomial) | | | |
| R2x* | −51.671 | 17.49 | |
| R2y* | −51.671 | | |
| lens 2 | | | 1.529 |
| R3(Ext. polynomial) | | | |
| R3x* | −458.049 | 6.95 | |
| R3y* | −458.049 | | |

TABLE 20

List of Maximum Spot Radius and Root Means Square Radius of Fifth Preferred Embodiment

| Y(mm) | 109.48 | 102.58 | 93.62 | 83.88 | 73.60 | 63.00 | 52.31 | 41.66 | 31.11 | 20.68 | 10.32 | 0.00 |
|---|---|---|---|---|---|---|---|---|---|---|---|---|
| Max. Spot Radius(μm) | 8.153 | 5.794 | 4.331 | 6.204 | 6.602 | 6.121 | 5.601 | 6.344 | 7.047 | 5.073 | 1.624 | 1.178 |
| RMS Spot Radius(μm) | 4.063 | 2.235 | 1.733 | 2.662 | 3.067 | 3.144 | 2.978 | 2.667 | 2.552 | 1.859 | 0.802 | 0.799 |

TABLE 21-continued

List of Optical Properties of fθ lens of Sixth Preferred Embodiment
$f_s = 34.163$

| optical surface | Radius (mm) | Thickness d (mm) | refraction index $n_d$ |
|---|---|---|---|
| R4(Toric) | | | |
| R4x | −125.463 | 65.46 | |
| R4y* | 947.263 | | |
| drum (drum)R5 | ∞ | 0.0 | |

*aspherical surface

TABLE 22(A)

Parameters for Aspherical Surface of Optical Surface of Sixth Preferred Embodiment

| | Toric Equation Coefficient | | | | |
|---|---|---|---|---|---|
| Optical Surface | Conic Coefficient (Ky) | 4th Order Coefficient (B4) | 6th Order Coefficient (B6) | 8th Order Coefficient (B8) | 10th Order Coefficient (B10) |
| R1* | 4.4964E+00 | 2.5138E−06 | −1.0359E−09 | 2.7212E−12 | −8.4279E−15 |
| R4* | −1.2544E+02 | −2.4604E−06 | −2.9977E−10 | 1.9307E−13 | −1.3388E−17 |

TABLE (B)

List of Parameters of Aspherical Surface of Optical Surface of Sixth Preferred Embodiment

| R2* | Extend Polynomial Equation Coefficient | | | | | | | | K (Conic Coefficient) = −0.2099 |
|---|---|---|---|---|---|---|---|---|---|
| Ai | $Y^0$ | $Y^1$ | $Y^2$ | $Y^3$ | $Y^4$ | $Y^5$ | $Y^6$ | $Y^7$ | $Y^8$ |
| $X^0$ | | 0.0000E+00 | 0.0000E+00 | −7.7913E−06 | 2.5974E−09 | 7.2594E−09 | −9.7449E−10 | 0.0000E+00 | −6.9352E−13 |
| $X^1$ | 0.0000E+00 | 0.0000E+00 | 0.0000E+00 | 0.0000E+00 | 0.0000E+00 | 0.0000E+00 | 0.0000E+00 | 0.0000E+00 | |
| $X^2$ | −3.7956E−02 | −1.8535E−06 | 5.6194E−07 | −3.3936E−07 | 8.6322E−09 | 0.0000E+00 | 4.8410E−12 | | |
| $X^3$ | 0.0000E+00 | 0.0000E+00 | 0.0000E+00 | 0.0000E+00 | 0.0000E+00 | | | | |
| $X^4$ | −3.9290E−03 | 1.3577E−04 | 1.2537E−05 | 0.0000E+00 | −1.2676E−08 | | | | |
| $X^5$ | 0.0000E+00 | 0.0000E+00 | 0.0000E+00 | 0.0000E+00 | | | | | |
| $X^6$ | 0.0000E+00 | 0.0000E+00 | 0.0000E+00 | | | | | | |
| $X^7$ | 0.0000E+00 | 0.0000E+00 | | | | | | | |
| $X^8$ | 0.0000E+00 | | | | | | | | |

| R3* | Extend Polynomial Equation Coefficient | | | | | | | | K (Conic Coefficient) = −123.3536 |
|---|---|---|---|---|---|---|---|---|---|
| Ai | $Y^0$ | $Y^1$ | $Y^2$ | $Y^3$ | $Y^4$ | $Y^5$ | $Y^6$ | $Y^7$ | $Y^8$ |
| $X^0$ | | 0.0000E+00 | 0.0000E+00 | −8.0092E−06 | −2.3994E−06 | 1.7307E−09 | −1.0000E−09 | 0.0000E+00 | 3.5430E−13 |
| $X^1$ | 0.0000E+00 | 0.0000E+00 | 0.0000E+00 | 0.0000E+00 | 0.0000E+00 | 0.0000E+00 | 0.0000E+00 | 0.0000E+00 | |
| $X^2$ | 4.8897E−03 | −1.7346E−04 | −3.1810E−06 | −7.2968E−08 | 1.7216E−09 | 0.0000E+00 | 5.5306E−13 | | |
| $X^3$ | 0.0000E+00 | 0.0000E+00 | 0.0000E+00 | 0.0000E+00 | 0.0000E+00 | 0.0000E+00 | | | |
| $X^4$ | −7.9062E−03 | 9.6527E−05 | 1.0777E−05 | 0.0000E+00 | −3.0160E−09 | | | | |
| $X^5$ | 0.0000E+00 | 0.0000E+00 | 0.0000E+00 | 0.0000E+00 | | | | | |
| $X^6$ | 0.0000E+00 | 0.0000E+00 | 0.0000E+00 | | | | | | |
| $X^7$ | 0.0000E+00 | 0.0000E+00 | | | | | | | |
| $X^8$ | 0.0000E+00 | | | | | | | | |

Figure 22:
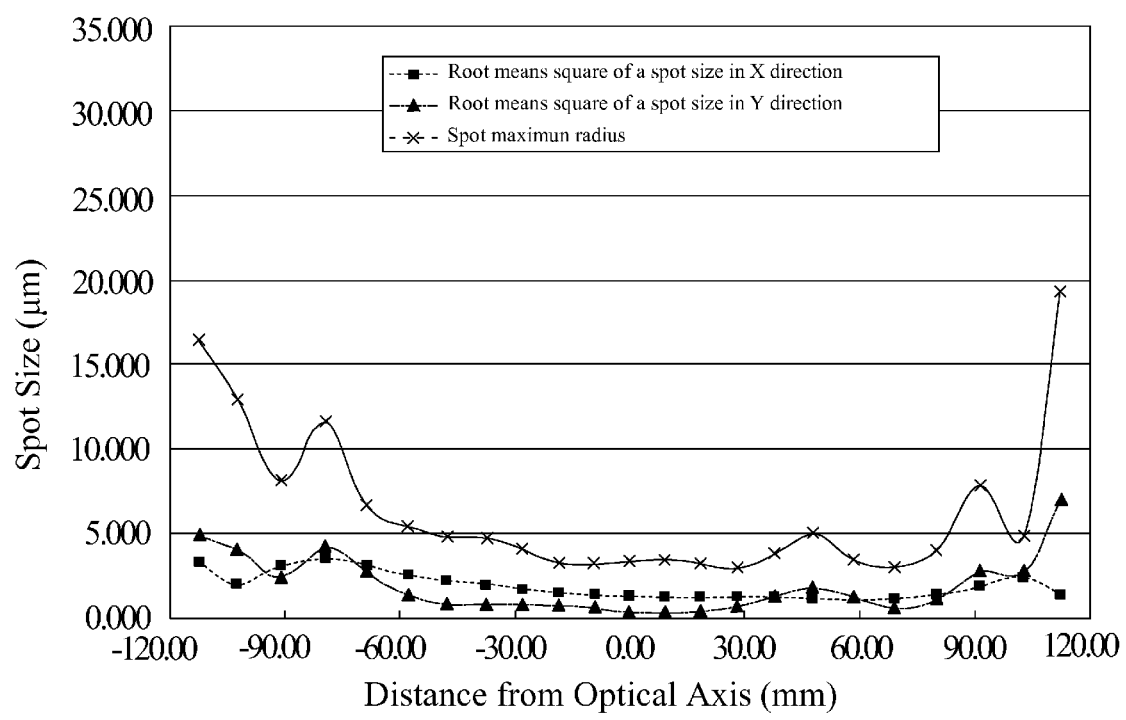
FIG. 22 is a schematic view of a spot distribution on a drum in accordance with a sixth preferred embodiment of the present invention.
Figure 23:
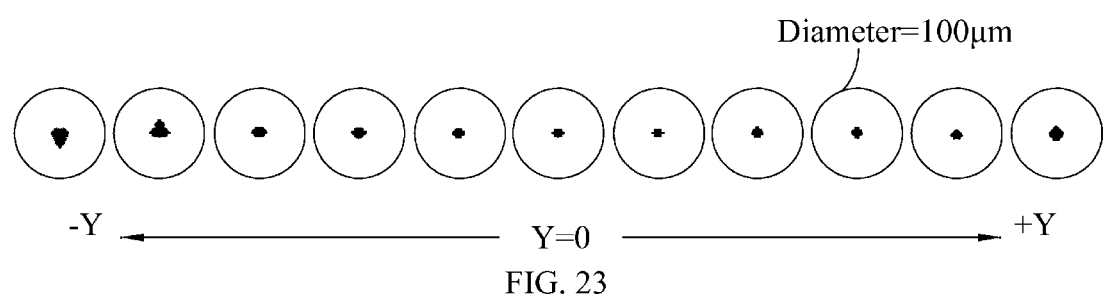
FIG. 23 is a schematic view of the sizes and shapes of spots formed at different positions of the target in accordance with a sixth preferred embodiment of the present invention.

For the optical surfaces of the aforementioned two-element fθ lens with short focal distance, $f_{(1)Y}=89.991$, $f_{(2)}=-521.085$ (mm), $y_a=65.46$, $y_b=58.208$ (mm), and the maximum window angle $\beta=33.523°$, such that a spot on the polygon mirror 10 can be scanned to form and focus a scanning light onto a drum 15 to form a smaller spot 6 and satisfy the conditions of Equations (4)~(6) and Equation (7)~(9) as shown in Table 23, and the radius (μm) of a geometric spot scanned at a distance from the central axis (z-axis) are shown in Table 24, and the RMS radius of the spot of the scanning light scanned in a Y direction from central axis onto the drum 15. The distribution and the spot size and shape of the spots of this preferred embodiment are shown in FIGS. 22 and 23.

TABLE 23

List of Conditions Satisfied by Sixth Preferred Embodiment

| | |
|---|---|
| $\dfrac{d_1 + d_3 + d_5}{f_s}$ | 2.7648 |
| $\tan(\beta) = \dfrac{y_b}{y_a}$ | 0.8892 |
| main scanning direction | 0.1598 |

TABLE 23-continued

List of Conditions Satisfied by Sixth Preferred Embodiment $$\left| f_s \cdot \left( \frac{(n_{d1} - 1)}{f_{(1)y}} + \frac{(n_{d2} - 1)}{f_{(2)y}} \right) \right|$$

TABLE 23-continued

List of Conditions Satisfied by Sixth Preferred Embodiment

| | |
|---|---|
| $\delta = \dfrac{\min(S_{max,Y})}{\max(S_{max,Y})}$ | 0.16 |
| $\eta_{max} = \dfrac{\max(S_b \cdot S_a)}{(S_{b0} \cdot S_{a0})}$ | 0.0035 |
| $\eta_{min} = \dfrac{\min(S_b \cdot S_a)}{(S_{b0} \cdot S_{a0})}$ | 0.00010 |

TABLE 24

List of Maximum Spot Radius and Root Means Square Radius of Sixth Preferred Embodiment

| Y(mm) | 112.44 | 102.82 | 91.33 | 80.01 | 68.98 | 58.25 | 47.83 | 37.76 | 28.01 | 18.52 | 9.21 | 0.00 |
|---|---|---|---|---|---|---|---|---|---|---|---|---|
| Max. Spot Radius(μm) | 19.320 | 4.986 | 7.902 | 4.158 | 3.088 | 3.540 | 5.156 | 3.890 | 3.067 | 3.314 | 3.479 | 3.465 |
| RMS Spot Radius(μm) | 7.201 | 3.776 | 3.506 | 1.915 | 1.403 | 1.765 | 2.283 | 1.931 | 1.534 | 1.408 | 1.399 | 1.475 |

In summation of the description of the aforementioned preferred embodiment, the present invention can achieve the following effects:

(1) With the installation of the two-element fθ lens with short focal distance of the present invention, the unequal scanning speed of the spots on the imaging surface of the polygon mirror can be corrected to an equal scanning speed, so that the laser beam can be projected onto the imaging surface at a constant scanning speed, and two adjacent spots formed on the target have equal intervals.

(2) With the installation of the two-element fθ lens with short focal distance of the present invention, the distortion formed by the scanning light in the main scanning direction and sub scanning direction can be corrected, so that the spots formed on the target can be scaled down.

(3) With the installation of the two-element fθ lens with short focal distance of the present invention, the distortion formed by the scanning light in the main scanning direction and the sub scanning direction can be corrected, so that the spot size on the target can be uniformed.

(4) With the installation of the two-element fθ lens with short focal distance of the present invention, the short focal distance can be decreased, so that the volume of the laser scanning unit can be reduced to achieve the miniaturization requirements.

What is claimed is:

1. A two-element fθ lens with short focal distance for a laser scanning unit, the laser scanning unit including a light source for emitting a laser beam, a polygon mirror for reflecting and converting the laser beam into a scanning light, and a target for sensing the scanning light; and the two-element fθ lens with short focal distance along an optical axis from a polygon mirror side to the target side comprising, a first lens, included a first optical surface and a second optical surface; and a second lens, included a third optical surface and a fourth optical surface;

wherein, a concave surface of the first optical surface, the second optical surface and the third optical surface toward the polygon mirror on optical axis in a main scanning direction; and the fourth optical surface having an inflection point in SAG counted from the optical axis to a peripheral portion and a paraxial portion is convex toward the polygon mirror side;

and the first optical surface, the second optical surface, the third optical surface, and the fourth optical surface are aspherical surfaces in the main scanning direction; satisfies the conditions of:

$$2.5 \leq \frac{d_1 + d_3 + d_5}{f_s} \leq 5.2;$$

$$0.5429 \leq \tan(\beta) \leq 1.2799;$$

wherein, $d_1$ is a distance from a reflecting surface of the polygon mirror on the optical axis to the first optical surface; $d_3$ is a distance from the second optical surface of the first lens to the third optical surface of the second lens along the optical axis; $d_5$ is a distance from the fourth optical surface of the second lens to the target along the optical axis; $f_s$ is a composition focal length of the two-element fθ lens; and $\beta$ is a maximum effective window angle.

2. The two-element fθ lens with short focal distance as claimed in claim 1, wherein the two-element fθ lens with short focal distance in the main scanning direction further satisfies the following condition of:

$$0.06 \leq \left| f_s \cdot \left( \frac{(n_{d1} - 1)}{f_{(1)y}} + \frac{(n_{d2} - 1)}{f_{(2)y}} \right) \right| \leq 0.22;$$

wherein $f_{(1)Y}$ is a focal length of the first lens in the main scanning direction, and $f_{(2)Y}$ is a focal length of the second lens in the main scanning direction, and $f_s$ is a composition focal length of the two-element fθ lens with short focal distance, and $n_{d1}$ and $n_{d2}$ are refraction indexes of the first lens and the second lens respectively.

3. The two-element fθ lens with short focal distance as claimed in claim 1, wherein the scanning light forms a largest spot and a smallest spot on the target, and a ratio of a size of the largest spot to the size of the smallest spot satisfies:

$$0.10 \leq \delta = \frac{\min(S_{max,Y})}{\max(S_{max,Y})},$$

wherein $S_{max,Y}$ is a maximum radius of the largest spot at the Y position of the target formed by the scanning light, δ is the ratio of the smallest spot $S_{max,Y}$ to the largest spot $S_{max,Y}$ on the target.

4. The two-element fθ lens with short focal distance as claimed in claim 1, wherein a size ratio of a largest spot on the target and the size ratio of a smallest spot on the target respectively satisfy the conditions of:

$$\eta_{max} = \frac{\max(S_b \cdot S_a)}{(S_{b0} \cdot S_{a0})} \le 0.05;$$

$$\eta_{min} = \frac{\min(S_b \cdot S_a)}{(S_{b0} \cdot S_{a0})} \le 0.005;$$

wherein $S_{a0}$ and $S_{b0}$ are root mean square radii of a spot of the scanning light on a reflecting surface of the polygon mirror in a sub scanning direction and the main scanning direction respectively; $S_a$ and $S_b$ are root mean square radii of any spot of the scanning light on a reflecting surface of the polygon mirror in the sub scanning direction and the main scanning direction respectively; $\eta_{max}$ is the ratio of the size of the largest spot scanned on the target to the size of the spot of the scanning light on a reflecting surface of the polygon mirror; and $\eta_{min}$ is the ratio of the size of the smallest spot scanned on the target to the size of the spot of the scanning light on a reflecting surface of the polygon mirror.

* * * * *